US008218196B2

(12) United States Patent
Fujiwara et al.

(10) Patent No.: US 8,218,196 B2
(45) Date of Patent: Jul. 10, 2012

(54) IMAGE PROCESSING METHOD AND IMAGE PROCESSING APPARATUS

(75) Inventors: Michiko Fujiwara, Yamatokoriyama (JP); Tomoe Matsuoka, Nishinomiya (JP); Takashi Usui, Kyoto (JP)

(73) Assignee: Sharp Kabushiki Kaisha, Osaka (JP)

( * ) Notice: Subject to any disclaimer, the term of this patent is extended or adjusted under 35 U.S.C. 154(b) by 1183 days.

(21) Appl. No.: 12/031,559

(22) Filed: Feb. 14, 2008

(65) Prior Publication Data

US 2008/0198393 A1 Aug. 21, 2008

(30) Foreign Application Priority Data

Feb. 15, 2007 (JP) ................................ P2007-035395

(51) Int. Cl.
*G06F 15/00* (2006.01)

(52) U.S. Cl. ......... 358/1.9; 358/461; 358/474; 358/504; 358/515; 358/518; 382/162; 382/167; 382/264

(58) Field of Classification Search ........................ None
See application file for complete search history.

(56) References Cited

U.S. PATENT DOCUMENTS

| | | | |
|---|---|---|---|
| 5,689,590 A * | 11/1997 | Shirasawa et al. ............ 382/254 |
| 6,055,074 A | 4/2000 | Himoto | |
| 6,958,834 B1 * | 10/2005 | Ide ................................ 358/505 |
| 2002/0126303 A1 * | 9/2002 | Yamada ......................... 358/1.9 |
| 2003/0210411 A1 | 11/2003 | Sawada | |
| 2005/0041267 A1 * | 2/2005 | Hirayama ....................... 358/2.1 |
| 2006/0066920 A1 * | 3/2006 | Saka et al. ..................... 358/474 |
| 2006/0153446 A1 * | 7/2006 | Oh et al. ........................ 382/169 |
| 2007/0052988 A1 * | 3/2007 | Matsuoka et al. ............. 358/1.9 |
| 2008/0252941 A1 * | 10/2008 | Hashizume .................... 358/474 |

FOREIGN PATENT DOCUMENTS

| | | |
|---|---|---|
| JP | 1-268352 A | 10/1989 |
| JP | 6-326861 A | 11/1994 |
| JP | 10-290373 A | 10/1998 |
| JP | 2002-218273 A | 8/2002 |
| JP | 2003-333351 A | 11/2003 |

\* cited by examiner

*Primary Examiner* — Dov Popovici
*Assistant Examiner* — Miya J Cato
(74) *Attorney, Agent, or Firm* — Birch, Stewart, Kolasch & Birch, LLP

(57) ABSTRACT

In the case where an output value of a document reading section for at least any of R, G and B is out of a range between a first reference value and a second reference value due to a change in an output value of a reading device caused by an electrical noise, a change of supply voltage, etc. when a document is being read, a second color conversion table is created in accordance with the above change by expanding ranges in a first color conversion table, which ranges are around predetermined first and second reference values and included in regions of RGB color system associated respectively with predetermined tone values of Y, M and C. Using the second color conversion table thus obtained, a color conversion is carried out from the RGB color system into the YMC color system.

13 Claims, 24 Drawing Sheets

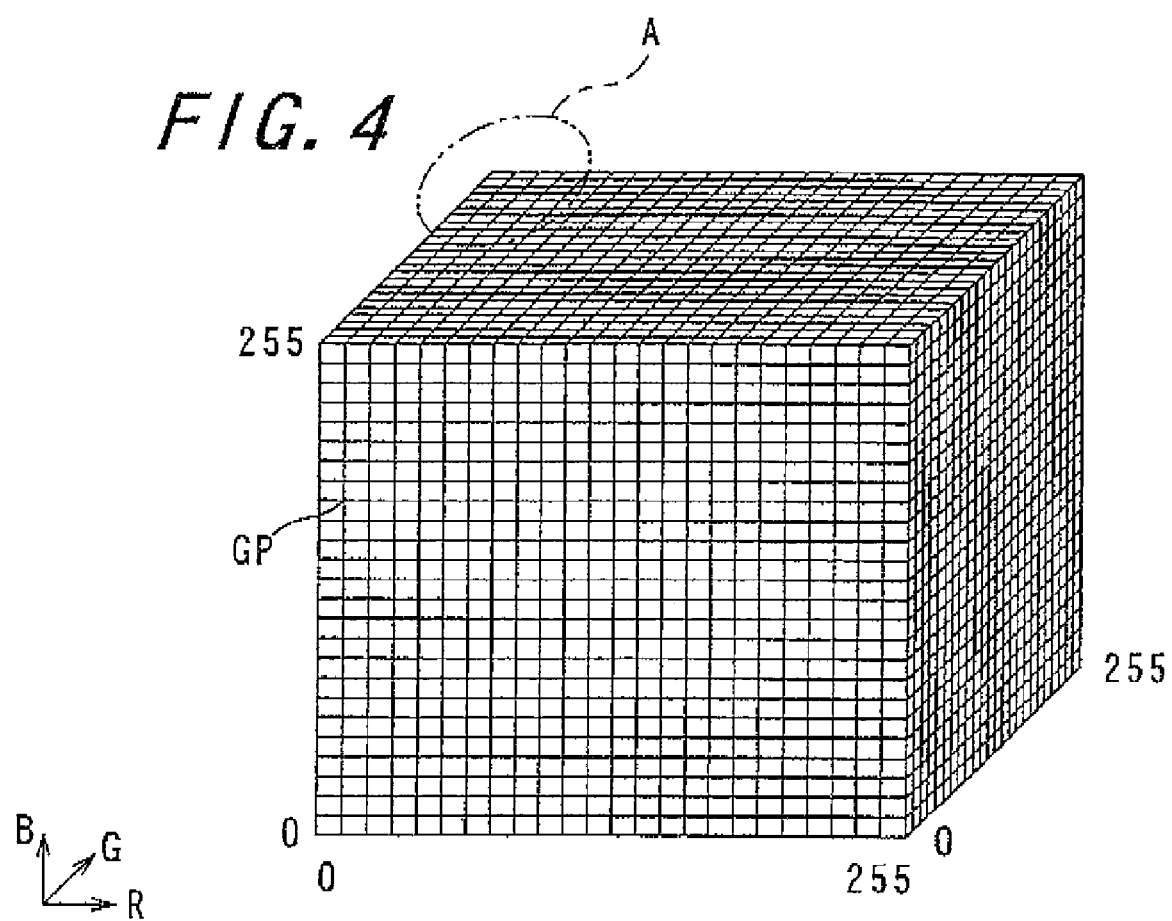

FIG. 5A

TBL1-1

| GPr=GPg=GPb | IN | OUT |
|---|---|---|
| | R=G=B | Y=M=C |
| 23 | 255 | 0 |
| 22 | 243 | 0 |
| 21 | 232 | 0 |
| 20 | 221 | 13 |
| 19 | 210 | 26 |
| 18 | 199 | 40 |
| 17 | 188 | 53 |
| 16 | 177 | 67 |
| 15 | 166 | 80 |
| 14 | 155 | 93 |
| 13 | 144 | 107 |
| 12 | 133 | 120 |
| 11 | 121 | 134 |
| 10 | 110 | 147 |
| 9 | 99 | 161 |
| 8 | 88 | 174 |
| 7 | 77 | 187 |
| 6 | 66 | 201 |
| 5 | 55 | 214 |
| 4 | 44 | 228 |
| 3 | 33 | 241 |
| 2 | 22 | 255 |
| 1 | 11 | 255 |
| 0 | 0 | 255 |

FIG. 5B

TBL1-2

| GPr (GPg=GPb=0) | IN R, G=B=0 | OUT C, Y=M=0 |
|---|---|---|
| 23 | 255 | 255 |
| 22 | 243 | 255 |
| 21 | 232 | 255 |
| 20 | 221 | 241 |
| 19 | 210 | 228 |
| 18 | 199 | 214 |
| 17 | 188 | 201 |
| 16 | 177 | 187 |
| 15 | 166 | 174 |
| 14 | 155 | 161 |
| 13 | 144 | 147 |
| 12 | 133 | 134 |
| 11 | 121 | 120 |
| 10 | 110 | 107 |
| 9 | 99 | 93 |
| 8 | 88 | 80 |
| 7 | 77 | 67 |
| 6 | 66 | 53 |
| 5 | 55 | 40 |
| 4 | 44 | 26 |
| 3 | 33 | 13 |
| 2 | 22 | 0 |
| 1 | 11 | 0 |
| 0 | 0 | 0 |

FIG. 5C

TBL2-1 (max=245, min=5)

| GPr=GPg=GPb | IN<br>R=G=B | OUT<br>Y=M=C |
|---|---|---|
| 23 | 255 | 0 |
| 22 | 243 | 0 |
| 21 | 245 | 0 |
| 20 | 229 | 13 |
| 19 | 214 | 26 |
| 18 | 199 | 40 |
| 17 | 188 | 53 |
| 16 | 177 | 67 |
| 15 | 166 | 80 |
| 14 | 155 | 93 |
| 13 | 144 | 107 |
| 12 | 133 | 120 |
| 11 | 121 | 134 |
| 10 | 110 | 147 |
| 9 | 99 | 161 |
| 8 | 88 | 174 |
| 7 | 77 | 187 |
| 6 | 66 | 201 |
| 5 | 55 | 214 |
| 4 | 38 | 228 |
| 3 | 21 | 241 |
| 2 | 5 | 255 |
| 1 | 11 | 255 |
| 0 | 0 | 255 |

FIG. 5D
TBL2-2
(max=245, min=5)

| GPr (GPg=GPb=0) | IN R, G=B=0 | OUT C, Y=M=0 |
|---|---|---|
| 23 | 255 | 255 |
| 22 | 243 | 255 |
| 21 | 245 | 255 |
| 20 | 229 | 241 |
| 19 | 214 | 228 |
| 18 | 199 | 214 |
| 17 | 188 | 201 |
| 16 | 177 | 187 |
| 15 | 166 | 174 |
| 14 | 155 | 161 |
| 13 | 144 | 147 |
| 12 | 133 | 134 |
| 11 | 121 | 120 |
| 10 | 110 | 107 |
| 9 | 99 | 93 |
| 8 | 88 | 80 |
| 7 | 77 | 67 |
| 6 | 66 | 53 |
| 5 | 55 | 40 |
| 4 | 38 | 26 |
| 3 | 21 | 13 |
| 2 | 5 | 0 |
| 1 | 11 | 0 |
| 0 | 0 | 0 |

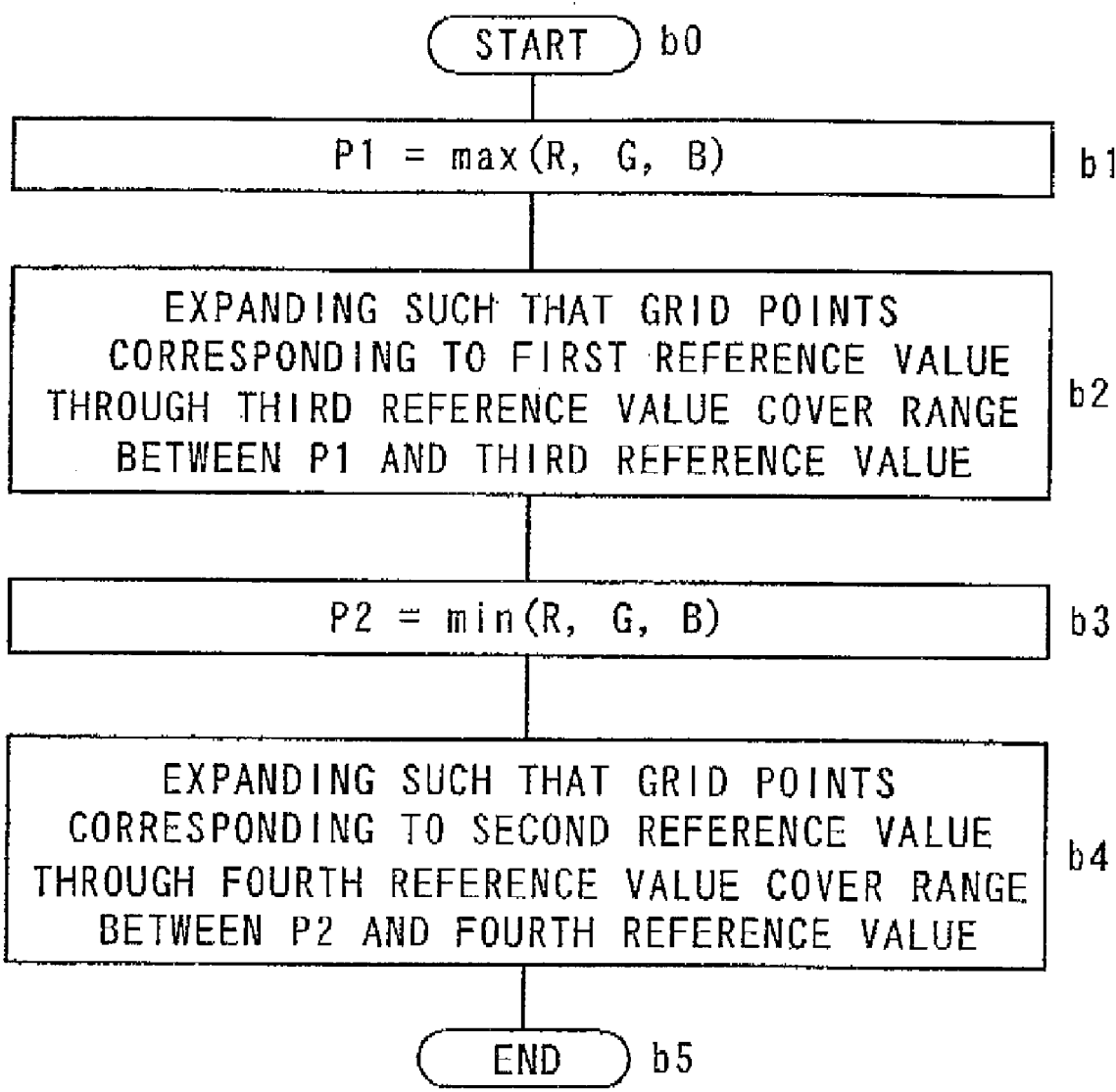

FIG. 8A

TBL1-3

| GPr=GPg=GPb | IN R=G=B | OUT Y=M=C |
|---|---|---|
| 23 | 230 | 0 |
| 22 | 220 | 11 |
| 21 | 211 | 22 |
| 20 | 201 | 33 |
| 19 | 192 | 44 |
| 18 | 183 | 55 |
| 17 | 173 | 66 |
| 16 | 164 | 77 |
| 15 | 155 | 88 |
| 14 | 145 | 99 |
| 13 | 136 | 110 |
| 12 | 127 | 121 |
| 11 | 117 | 133 |
| 10 | 108 | 144 |
| 9 | 99 | 155 |
| 8 | 89 | 166 |
| 7 | 80 | 177 |
| 6 | 71 | 188 |
| 5 | 61 | 199 |
| 4 | 52 | 210 |
| 3 | 43 | 221 |
| 2 | 33 | 232 |
| 1 | 24 | 243 |
| 0 | 15 | 255 |

FIG. 8B

TBL1-4

| GPr (GPg=GPb=0) | IN R, G=B=0 | OUT C, Y=M=0 |
|---|---|---|
| 23 | 230 | 255 |
| 22 | 220 | 243 |
| 21 | 211 | 232 |
| 20 | 201 | 221 |
| 19 | 192 | 210 |
| 18 | 183 | 199 |
| 17 | 173 | 188 |
| 16 | 164 | 177 |
| 15 | 155 | 166 |
| 14 | 145 | 155 |
| 13 | 136 | 144 |
| 12 | 127 | 133 |
| 11 | 117 | 121 |
| 10 | 108 | 110 |
| 9 | 99 | 99 |
| 8 | 89 | 88 |
| 7 | 80 | 77 |
| 6 | 71 | 66 |
| 5 | 61 | 55 |
| 4 | 52 | 44 |
| 3 | 43 | 33 |
| 2 | 33 | 22 |
| 1 | 24 | 11 |
| 0 | 15 | 0 |

FIG. 8C

TBL2-3 (max=245, min=5)

| GPr=GPg=GPb | IN<br>R=G=B | OUT<br>Y=M=C |
|---|---|---|
| 23 | 245 | 0 |
| 22 | 230 | 11 |
| 21 | 215 | 22 |
| 20 | 201 | 33 |
| 19 | 192 | 44 |
| 18 | 183 | 55 |
| 17 | 173 | 66 |
| 16 | 164 | 77 |
| 15 | 155 | 88 |
| 14 | 145 | 99 |
| 13 | 136 | 110 |
| 12 | 127 | 121 |
| 11 | 117 | 133 |
| 10 | 108 | 144 |
| 9 | 99 | 155 |
| 8 | 89 | 166 |
| 7 | 80 | 177 |
| 6 | 71 | 188 |
| 5 | 61 | 199 |
| 4 | 52 | 210 |
| 3 | 40 | 221 |
| 2 | 28 | 232 |
| 1 | 16 | 243 |
| 0 | 5 | 255 |

FIG. 8D

TBL2-4
(max=245, min=5)

| GPr (GPg=GPb=0) | IN R, G=B=0 | OUT C, Y=M=0 |
|---|---|---|
| 23 | 245 | 255 |
| 22 | 230 | 243 |
| 21 | 215 | 232 |
| 20 | 201 | 221 |
| 19 | 192 | 210 |
| 18 | 183 | 199 |
| 17 | 173 | 188 |
| 16 | 164 | 177 |
| 15 | 155 | 166 |
| 14 | 145 | 155 |
| 13 | 136 | 144 |
| 12 | 127 | 133 |
| 11 | 117 | 121 |
| 10 | 108 | 110 |
| 9 | 99 | 99 |
| 8 | 89 | 88 |
| 7 | 80 | 77 |
| 6 | 71 | 66 |
| 5 | 61 | 55 |
| 4 | 52 | 44 |
| 3 | 40 | 33 |
| 2 | 28 | 22 |
| 1 | 16 | 11 |
| 0 | 5 | 0 |

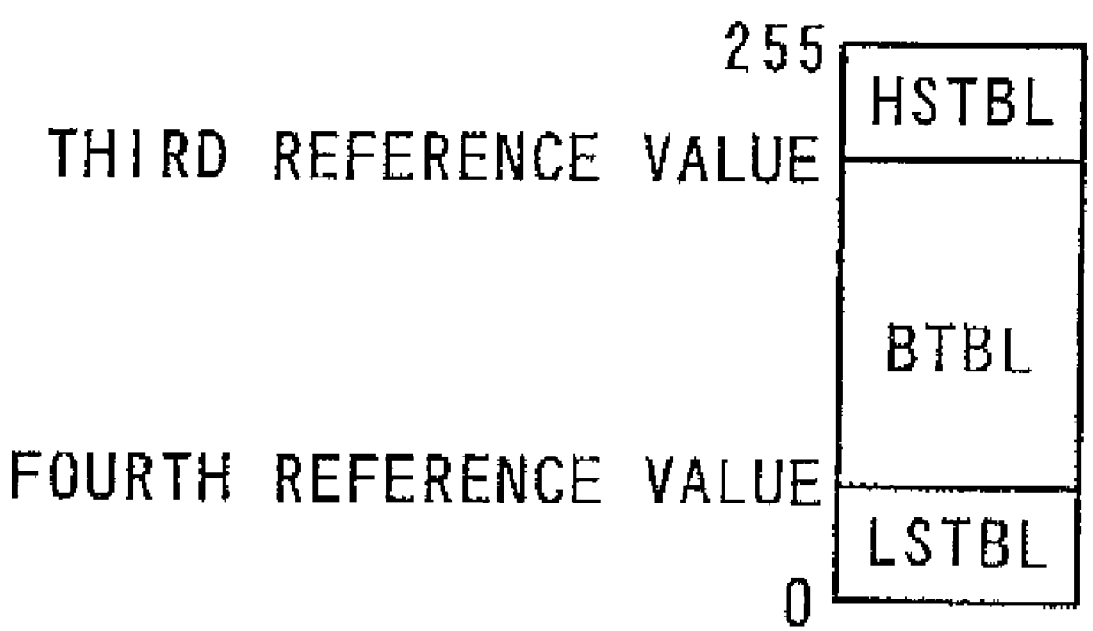

FIG. 11A

BTBL1

| GPr=GPg=GPb | IN | OUT |
|---|---|---|
| | R=G=B | Y=M=C |
| 19 | 192 | 44 |
| 18 | 183 | 55 |
| 17 | 173 | 66 |
| 16 | 164 | 77 |
| 15 | 155 | 88 |
| 14 | 145 | 99 |
| 13 | 136 | 110 |
| 12 | 127 | 121 |
| 11 | 117 | 133 |
| 10 | 108 | 144 |
| 9 | 99 | 155 |
| 8 | 89 | 166 |
| 7 | 80 | 177 |
| 6 | 71 | 188 |
| 5 | 61 | 199 |
| 4 | 52 | 210 |

FIG. 11B

BTBL2

| GPr (GPg=GPb=0) | IN<br>R, G=B=0 | OUT<br>Y, M=C=0 |
|---|---|---|
| 19 | 192 | 44 |
| 18 | 183 | 55 |
| 17 | 173 | 66 |
| 16 | 164 | 77 |
| 15 | 155 | 88 |
| 14 | 145 | 99 |
| 13 | 136 | 110 |
| 12 | 127 | 121 |
| 11 | 117 | 133 |
| 10 | 108 | 144 |
| 9 | 99 | 155 |
| 8 | 89 | 166 |
| 7 | 80 | 177 |
| 6 | 71 | 188 |
| 5 | 61 | 199 |
| 4 | 52 | 210 |

FIG. 12A

HSTBL0-1

| GPr=GPg=GPb | IN | OUT |
|---|---|---|
| | R=G=B | Y=M=C |
| 23 | 230 | 0 |
| 22 | 220 | 11 |
| 21 | 211 | 22 |
| 20 | 201 | 33 |

FIG. 12B

HSTBL1-1

| GPr=GPg=GPb | IN | OUT |
|---|---|---|
| | R=G=B | Y=M=C |
| 23 | 234 | 0 |
| 22 | 223 | 11 |
| 21 | 212 | 22 |
| 20 | 201 | 33 |

FIG. 12C

HSTBL2-1

| GPr=GPg=GPb | IN | OUT |
|---|---|---|
| | R=G=B | Y=M=C |
| 23 | 239 | 0 |
| 22 | 226 | 11 |
| 21 | 213 | 22 |
| 20 | 201 | 33 |

FIG. 12D

HSTBL3-1

| GPr=GPg=GPb | IN | OUT |
|---|---|---|
| | R=G=B | Y=M=C |
| 23 | 244 | 0 |
| 22 | 229 | 11 |
| 21 | 215 | 22 |
| 20 | 201 | 33 |

FIG. 12E

HSTBL4-1

| GPr=GPg=GPb | IN | OUT |
|---|---|---|
| | R=G=B | Y=M=C |
| 23 | 249 | 0 |
| 22 | 233 | 11 |
| 21 | 217 | 22 |
| 20 | 201 | 33 |

FIG. 12F

HSTBL5-1

| GPr=GPg=GPb | IN | OUT |
|---|---|---|
| | R=G=B | Y=M=C |
| 23 | 255 | 0 |
| 22 | 237 | 11 |
| 21 | 219 | 22 |
| 20 | 201 | 33 |

FIG. 12G

HSTBL0-2

| GPr (GPg=GPb=0) | IN | OUT |
|---|---|---|
| | R, G=B=0 | C, Y=M=0 |
| 23 | 230 | 255 |
| 22 | 220 | 243 |
| 21 | 211 | 232 |
| 20 | 201 | 221 |

FIG. 12H

HSTBL1-2

| GPr (GPg=GPb=0) | IN | OUT |
|---|---|---|
| | R, G=B=0 | C, Y=M=0 |
| 23 | 234 | 255 |
| 22 | 223 | 243 |
| 21 | 212 | 232 |
| 20 | 201 | 221 |

FIG. 12I

HSTBL2-2

| GPr (GPg=GPb=0) | IN R, G=B=0 | OUT C, Y=M=0 |
|---|---|---|
| 23 | 239 | 255 |
| 22 | 226 | 243 |
| 21 | 213 | 232 |
| 20 | 201 | 221 |

FIG. 12J

HSTBL3-2

| GPr (GPg=GPb=0) | IN R, G=B=0 | OUT C, Y=M=0 |
|---|---|---|
| 23 | 244 | 255 |
| 22 | 229 | 243 |
| 21 | 215 | 232 |
| 20 | 201 | 221 |

FIG. 12K

HSTBL4-2

| GPr (GPg=GPb=0) | IN R, G=B=0 | OUT C, Y=M=0 |
|---|---|---|
| 23 | 249 | 255 |
| 22 | 233 | 243 |
| 21 | 217 | 232 |
| 20 | 201 | 221 |

FIG. 12L

HSTBL5-2

| GPr (GPg=GPb=0) | IN R, G=B=0 | OUT C, Y=M=0 |
|---|---|---|
| 23 | 255 | 255 |
| 22 | 237 | 243 |
| 21 | 219 | 232 |
| 20 | 201 | 221 |

FIG. 13A

LSTBL0-1

| GPr=GPg=GPb | IN | OUT |
|---|---|---|
| | R=G=B | Y=M=C |
| 3 | 43 | 221 |
| 2 | 33 | 232 |
| 1 | 24 | 243 |
| 0 | 15 | 255 |

FIG. 13B

LSTBL1-1

| GPr=GPg=GPb | IN | OUT |
|---|---|---|
| | R=G=B | Y=M=C |
| 3 | 41 | 221 |
| 2 | 31 | 232 |
| 1 | 20 | 243 |
| 0 | 10 | 255 |

FIG. 13C

LSTBL2-1

| GPr=GPg=GPb | IN | OUT |
|---|---|---|
| | R=G=B | Y=M=C |
| 3 | 40 | 221 |
| 2 | 28 | 232 |
| 1 | 16 | 243 |
| 0 | 5 | 255 |

FIG. 13D

LSTBL3-1

| GPr=GPg=GPb | IN | OUT |
|---|---|---|
| | R=G=B | Y=M=C |
| 3 | 39 | 221 |
| 2 | 26 | 232 |
| 1 | 13 | 243 |
| 0 | 0 | 255 |

*FIG. 13E*

LSTBL0-2

| GPr (GPg=GPb=0) | IN R, G=B=0 | OUT C, Y=M=0 |
|---|---|---|
| 3 | 43 | 33 |
| 2 | 33 | 22 |
| 1 | 24 | 11 |
| 0 | 15 | 0 |

*FIG. 13F*

LSTBL1-2

| GPr (GPg=GPb=0) | IN R, G=B=0 | OUT C, Y=M=0 |
|---|---|---|
| 3 | 41 | 33 |
| 2 | 31 | 22 |
| 1 | 20 | 11 |
| 0 | 10 | 0 |

*FIG. 13G*

LSTBL2-2

| GPr (GPg=GPb=0) | IN R, G=B=0 | OUT C, Y=M=0 |
|---|---|---|
| 3 | 40 | 33 |
| 2 | 28 | 22 |
| 1 | 16 | 11 |
| 0 | 5 | 0 |

*FIG. 13H*

LSTBL3-2

| GPr (GPg=GPb=0) | IN R, G=B=0 | OUT C, Y=M=0 |
|---|---|---|
| 3 | 39 | 33 |
| 2 | 26 | 22 |
| 1 | 13 | 11 |
| 0 | 0 | 0 |

IMAGE PROCESSING METHOD AND IMAGE PROCESSING APPARATUS

CROSS-REFERENCE TO RELATED APPLICATION

This application claims priority to Japanese Patent Application No. 2007-035395, which was filed on. Feb. 15, 2007, the contents of which are incorporated herein by reference in its entirety.

BACKGROUND OF THE INVENTION

1. Field of the Invention

The present invention relates to an image processing method and apparatus for performing shading correction.

2. Description of the Related Art

In a related art, a scanner reads a white board for proofreading before reading a document, thereby adjusting an output level of RGB color system outputted from the scanner so that the output level is 255 in white background and zero in black background. A processing just stated is referred to as shading correction. The shading correction is carried out to reduce a color misalignment generated upon conversion from the RGB color system that is employed in a scanner into the CMY color system that is employed in a printing machine such as a printer.

There exist the following techniques for reducing the color misalignment generated upon converting image data of RGB color system into image data of CMY color system.

In a technique disclosed in Japanese Unexamined Patent Publication JP-A 1-268352 (1989), a plurality of color parameters determined based on RGB signals are multiplied by conversion factors for respective colors which correspond to respective colors of Y, M and C when the image data of RGB color system is being converted into the image data of CMY color system.

Next, in a technique disclosed in Japanese Unexamined Patent Publication JP-A 6-326861 (1994), color conversion input data XYZ is converted into values of Lab, and YMC obtained by performing color conversion on the color conversion input data XYZ is also converted into values of Lab, thereafter setting a conversion parameter such that a difference ΔE between the values of Lab is minimized.

Further, in a technique disclosed in Japanese Unexamined Patent Publication JP-z 2002-218273, RGB image data is converted into Lab image data, and the Lab image data is then treated with the color correction and converted into YMC image data based on which YMCK image data is produced.

Even when the image data adjusted by the shading correction is corrected by the color conversion as in the cases of the above techniques, there remains a problem that a color misalignment may be generated in the YMC image data, thus decreasing the image reproducibility, through image processing on data outputted by the scanner, which data is out of the range adjusted by the shading correction due to electrical noise, a change of supply voltage, a fluorescent color, a whiteness degree of sheet, and the like element.

SUMMARY OF THE INVENTION

An object of the invention is to provide an image processing method and apparatus capable of preventing color misalignment to form images which exhibit high tone reproducibility.

The invention provides an image processing method for color conversion from image data represented in an RGB color system outputted from a reading device for reading a document, into image data represented in a YMC color system by using a color conversion table where a plurality of regions sectioned into blocks in a color space of RGB color system are associated respectively with predetermined tone values of Y (yellow), M (magenta) and C (cyan), the image processing method comprising the steps of:

carrying out shading correction for, in a case where tone values of R (red), G (green) and B (blue) for representing white are larger than tone values of R, G and B for representing black, adjusting output values of the reading device which are obtained in reading a reference of white from the reading device, to a predetermined first reference value smaller than a maximum tone value, and adjusting output values of the reading device which are obtained in reading a reference of black from the reading devices to a predetermined second reference value larger than a minimum tone value, and in a case where tone values of R, G and B for representing black are larger than tone values of R, G and B for representing white, adjusting output values of the reading device which are obtained in reading the reference of white from the reading device, to the predetermined second reference value larger than the minimum tone value, and adjusting output values of the reading device which are obtained in reading the reference of black from the reading device, to the predetermined first reference-value smaller than the maximum tone value; and carrying out color conversion by using a color conversion table obtained by expanding ranges around the predetermined first reference value and the second reference value in the color conversion table, ranges being included in the regions of RGB color system associated respectively with predetermined tone values of Y, M and C, in a case where at least any one of output values of R, G and B outputted from the reading device after reading a document is out of a range between the predetermined first reference value and the predetermined second reference value.

According to the invention, the image data represented in the RGB color system outputted from the reading device for reading a document is color-converted into the image data represented in the YMC color system by using the color conversion table where the plurality of the block regions sectioned in the color space of RGB color system are associated respectively with the predetermined tone values of Y (yellow), M (magenta) and C (cyan).

In the case where the tone values of R (red), G (green) and B (blue) for representing white are larger than the tone values of R, G and S for representing black, the shading correction is carried out to thereby adjust the output values of the reading device when the reference of white is read, to the predetermined first reference value smaller than the maximum tone value, and adjust the output values of the reading device which are obtained in reading the reference of black from the reading device, to the predetermined second reference value larger than the minimum tone value.

Further, in the case where the tone values of R, G and B for representing black are larger than the tone values of R, G and B for representing white, the shading correction is carried out to thereby adjust the output values of the reading device obtained in reading the reference of white, to the predetermined second reference value larger than the minimum tone value, and adjust the output values of the reading device which are obtained in reading the reference of black from the reading device, to the predetermined first reference value smaller than the maximum tone value.

This enables to secure a marginal region for absorbing variation that may be generated in the output values of the reading device due to electrical noise, a change of supply voltage, etc. when the document is being read.

When the document is being read, the electrical noise, the change of supply voltage, etc. may cause the output value of the reading device to change. In the case where among the output values of the reading device, at least any value of R (red), G (green) and B (blue) does not fall in a range between the predetermined first reference value and the predetermined second reference value, the expanding process is applied to the color conversion table in accordance with the change in the output value of the reading device, to thereby expand the ranges which are located around the predetermined first and second reference values and included in the regions of RGB color system associated respectively with the predetermined tone values of Y, M and C. The output value of the reading device is thus prevented from being out of the regions of RGB color system, and able to be included in any of the regions. Since the regions are associated respectively with the predetermined tone values of Y, M and C, the conversion into the image data of YMC color system can be achieved. The correction can be therefore carried out so as to reduce color misalignments which are generated easily around the maximum tone value and the minimum tone value among the tone values of R, G and B in the image data of RGB color system being converted into the YMC image data. As a result, it is possible to obtain images which exhibit high tone reproducibility.

The invention provides an image processing method for color conversion from image data outputted from a reading device for reading a document, in which image data is represented in an RGB color system and in which image data tone values of R (red), G (green) and B (blue) for representing white are larger than tone values of R, G and B for representing black, into image data represented in a YMC color system by using a color conversion table where a plurality of regions sectioned into blocks in a color space of RGB color system are associated respectively with predetermined tone values of Y (yellow), M (magenta) and C (cyan), the image processing method comprising the steps of:

adjusting an output values of the reading device which are obtained in reading a reference of white from the reading device, to a predetermined first reference value smaller than a maximum tone value, and adjusting output values of the reading device which are obtained in reading a reference of black from the reading device, to a predetermined second reference value larger than a minimum tone value; and carrying out color conversion by using a color conversion table obtained by expanding a range which is located around the region including the predetermine first reference value in the color conversion table and is included in the regions of RGB color system associated respectively with predetermined tone values of Y, M and C, in a case where at least any one of output values of R, G and B outputted from the reading device after reading a document exceeds the predetermined first reference value.

According to the invention, the image data outputted from the reading device for reading a document, in which image data is represented in the RGB color system and in which the image data tone values of R (red), G (green) and B (blue) for representing white are larger than the tone values of R, G and B for representing black, are color-converted into the image data represented in the YMC color system by using the color conversion table where the plurality of the block regions sectioned in the color space of RGB color system are associated respectively with the predetermined tone values of Y (yellow), M (magenta) and C (cyan).

The shading correction is carried out to thereby adjust the output values of the reading device which are obtained in reading the reference of white from the reading device, to the predetermined first reference value, and adjust the output values of the reading device which are obtained in reading the reference of black from the reading device, to the predetermined second reference value. This enables to secure a marginal region for absorbing variation that may be generated in the output values of the reading device due to electrical noise, a change of supply voltage, etc. when the document is being read.

When the document is being read, the electrical noise, the change of supply voltage, etc. may cause the output value of the reading device to change. In the case where among the output values of the reading device, at least any value of R (red), G (green) and B (blue) exceeds the predetermined first reference value, the expanding process is applied to the color conversion table in accordance with the change in the output value of the reading device, to thereby expand the range which is located around the region including the predetermined first reference value and which is included in the regions of RGB color system associated respectively with the predetermined tone values of Y, M and C. The output value of the reading device is thus prevented from being out of the regions of KGB color system, and able to be included in any of the regions. Since the regions are associated respectively with the predetermined tone values of Y, M and C, the conversion into the image data of YMC color system can be achieved. The correction can be therefore carried out so as to reduce a color misalignment which is generated easily around the maximum tone value among the tone values of R, G and B in the image data of RGB color system being converted into the YMC image data. As a result, it is possible to obtain images which exhibit high tone reproducibility.

Further, in the invention, it is preferable that the range to be expanded is set to be a range located closer to the predetermined first reference value relative to a predetermined third reference value which is smaller than the predetermined first reference value by a predetermined value.

According to the invention, the range located closer to the predetermined first reference value relative to the predetermined third reference value which is smaller than the predetermined first reference value by the predetermined value, is determined as the range to be expanded, with the result that the color misalignment due to the expanding process can be minimum, allowing for formation of images exhibiting higher tone reproducibility.

Further, in the invention, it is preferable that each of the regions of ROE color system corresponds to a plurality of tone values for each of R, G and B.

According to the invention, each of the regions of ROD color system corresponds to not one tone value for R, G and B, but a plurality of tone values for each of R, G and B. This thus results in a color conversion table where the tone values of R, G and B are associated with the tone values of C, M and Y so that the tone values of each of R, G and B among the plurality of predetermined tone values (e.g. 103 to 113) are converted into one tone value (e.g. 110) of C, M and Y. By associating the plurality of block regions sectioned in A the color space of RGB color system with the predetermined values of YMC color system, the data quantity of the color conversion table can be smaller because the number of YMC tone values required for the color conversion table is only the number of regions.

Further, in the invention, it is preferable that in expanding the range included in the regions of RGB color system, a maximum value of the tone values of RGB color system after expansion is selected to be a maximum value of R (red), G (green) and B (blue) among the output values of the reading device after reading the document.

According to the invention, in expanding the range included in the regions of RGB color system the maximum value of the tone values of RGB color system after the expanding process is selected to be the maximum value of R (red), G (green) and B (blue) among the output values of the reading device after reading the document, with the result that a hue can be maintained, allowing for formation of images exhibiting higher tone reproducibility.

Further, in the invention, it is preferable that, of the color space of RGB system, even the region where any of the tone values of R, G and B is out of a range between the first reference value and the second reference value, is associated with the predetermined tone values of Y, M and C in the color conversion table.

According to the invention, of the color space of RGB system, even the region where any of the tone values of R, G and B is out of the range between the first reference value and the second reference value, is associated with the predetermined tone values of Y, M and C in the color conversion table, with the result that inputted image data having unexpected tone values can also be treated.

Further, in the invention, it is preferable that, of the color space of RGB system, the region where the tone values of R, G and B are included in the range between the first reference value and the second reference value, is associated with the predetermined tone values of Y, M and C in the color conversion table to which no expanding process is applied.

According to the invention, of the color space of RGB system, the region where the tone values of R, G and B are included in the range between the first reference value and the second reference value is associated with the predetermined tone values of Y, M and C in the color conversion table, with the result that a more detailed color conversion table can be created by decreasing the range included in the region between the first reference value and the second reference value, allowing for formation of images exhibiting higher tone reproducibility.

Further, the invention provides an image processing apparatus for performing image processing through the image processing method.

According to the invention, it is possible to provide the image processing apparatus capable of preventing the color misalignment to form images which exhibit high tone reproducibility.

BRIEF DESCRIPTION OF THE DRAWINGS

Other and further objects, features, and advantages of the invention will be more explicit from the following detailed description taken with reference to the drawings wherein:

FIG. 4 is a view showing a color space of RGB color system;

FIGS. 5A to 5D are views each of which shows one example of a part of a color conversion table TBL;

FIG. 7 is a flowchart for showing an expanding process operated by an input-processing portion;

FIGS. 8A to 8D are views each of which shows one example of a part of a color conversion table TBL according to another embodiment of the invention;

FIG. 10 is a view showing a composition of a color conversion table TBL used in the embodiment;

FIGS. 11A and 11B are views each of which shows one example of a part of a basic region table BTBL, FIGS. 12A to 12L are views each of which shows one example of a part of a high tone region table HSTBL;

FIGS. 13A to 13H are views each of which shows one example of a part of a low tone region table LSTBL.

DETAILED DESCRIPTION

Figure 1:
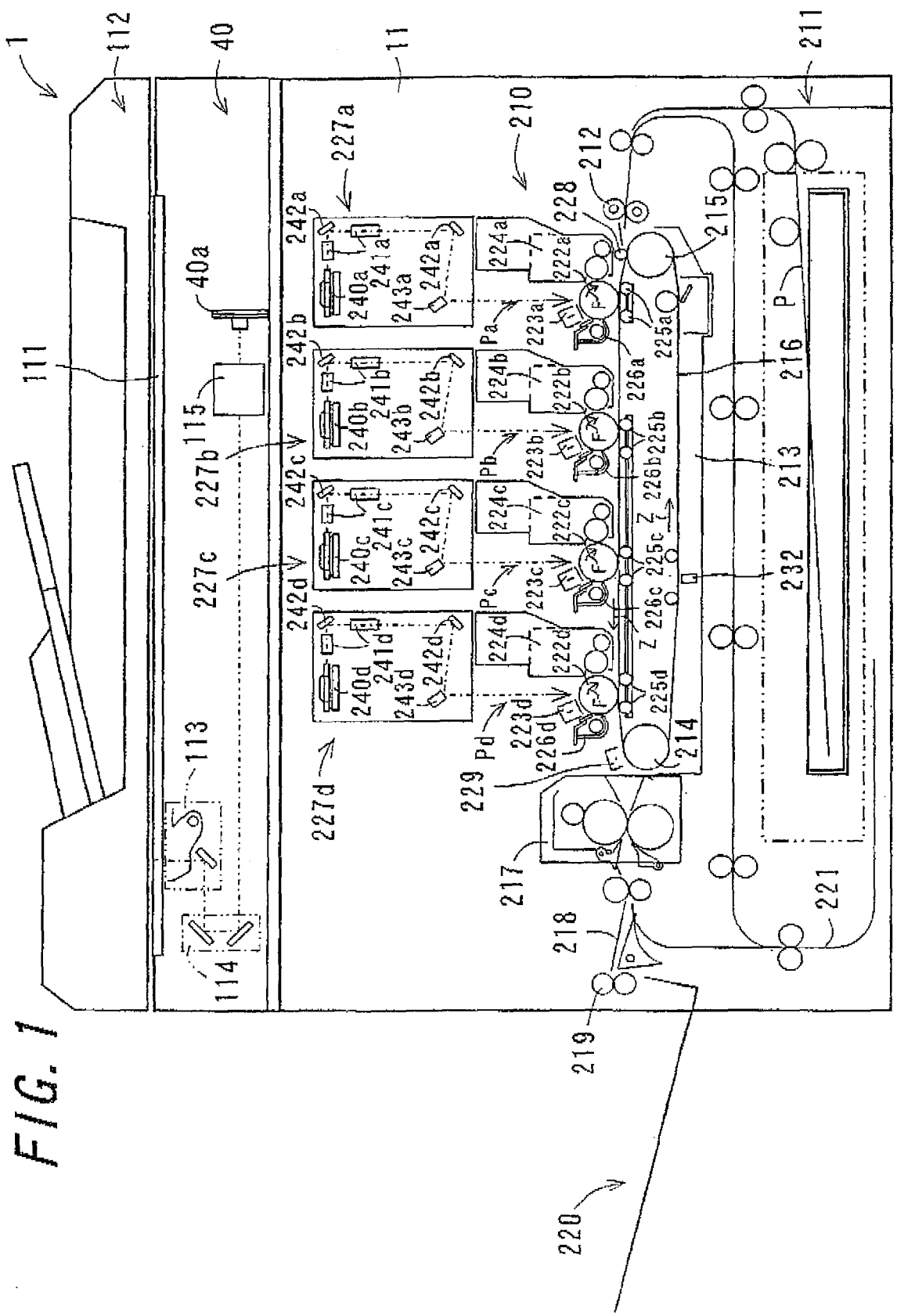
FIG. 1 is a sectional front view schematically showing a configuration of a digital color copier serving as an image forming apparatus according to one embodiment of the invention.

Now referring to the drawings, preferred embodiments of the invention are described below.

FIG. 1 is a sectional front view schematically showing a configuration of a digital color copier 1 serving as an image forming apparatus according to one embodiment of the invention. The digital color copier 1 includes a copier body 11 and a reversing automatic document feeder (abbreviated as RADF) 112. On the top of the copier body 11, a document table 111 and an operation panel (not shown) are provided while inside the copier body 11, a document reading section 40 serving as a reading device and an image forming section 210 are provided.

On the top of the copier body 11, a reversing automatic document feeder 112 is mounted which is pivotally supported on the document table 111, that is, supported so as to be angularly-displaceable, and located at a predetermined position relative to the document table 111.

The reversing automatic document feeder 112 is configured to firstly convey a document so that one surface of the document faces the document reading section 40 at a predetermined position on the document table 111, and after completion of reading an image on the one surface, reverse the document so that the other surface of the document faces the document reading section 40 at a predetermined position on the document table 111 to thereby convey the document toward the document table 111. And the reversing automatic document feeder 112 discharges one sheet of document after completion of reading both surfaces of the document, and then performs another duplex conveying operation on the next document. The above operations of conveying and reversing the document are controlled in connection with the whole operation in the copier. A surface of the reversing automatic document feeder 112 opposite to the document table 111 is provided with a white board which acts an a reference for a white color. The white board is disposed in such a region that the white board can be read by the document reading section 40.

The document reading section 40 is disposed below the document table 111 in order to read an image on the document which has been conveyed by the reversing automatic document feeder 112 onto the document table 111. The document table 111 is achieved by a plate-like contact glass. The document reading section 40 includes document scanning members 113 and 114, an optical lens 115, and a charge coupled device (abbreviated as CCD) line sensor 40a. The document scanning members 113 and 114 reciprocate in parallel with an undersurface of the document table 111. The CCD line sensor 40a is a photoelectric conversion element.

The document scanning members 113 and 114 are composed of a first scanning unit 113 and the second scanning unit 114. The first scanning unit 113 has an exposure lamp for exposing a surface of document image, and a first mirror for deflecting in a predetermined direction an optical image of light reflected by the document. The first scanning unit 113 reciprocates at a predetermined scanning speed in parallel with the undersurface of the document table 111, keeping a predetermined distance therefrom. The second scanning unit 114 has a second mirror and a third mirror, each of which further deflects in a predetermined direction the optical image of light reflected by the document that has been deflected by the first mirror. The second scanning unit 114 reciprocates in parallel with the first scanning unit 113 at a speed that maintains a constant relation with the speed of the first scanning unit 113.

The optical lens 115 scales down the optical image of light reflected by the document that has been deflected by the third mirror in the second scanning unite and produces the downscaled optical image at a predetermined position on the CCD line sensor 40a.

The CCD line sensor 40a sequentially treats the produced optical image with the photoelectric conversion, thereafter outputting the image in form of electric signals. The CCD line sensor 40a is a three-line color CCD image sensor which is capable of reading a monochrome image or a color image and outputting line data composed of separated color components of R (red), G (green), and B (blue). Document image information in form of the electric signals converted by the CCD line sensor 40a is then transferred to a later-described image processing section 41 where the document image information is furthermore treated with a predetermined image data processing.

Next, descriptions will be given to a configuration of the image forming section 210 and configurations of various parts relating to the image forming section 210. Below the image forming section 210, a paper-feed mechanism 211 is provided which supplies sheets (recording mediums) P stored in a sheet tray to the image forming section 210 one by one. And the sheet P supplied one by one from the paper-feed mechanism 211 is conveyed to the image forming section 210 at a time controlled by a pair of registration rollers 212 which are disposed before the image forming section 210, that is, on an upstream side in a conveyance direction of the sheet P. Furthermore, the sheet P on whose one surface an image has been formed, may be conveyed so as to be fed again to the image forming section 210 at the right time for the image forming operation in the image forming section 210.

Below the image forming section 210, a transfer-conveying belt mechanism 213 is disposed. The transfer-conveying belt mechanism 213 is so configured that the sheet P is conveyed as being electrostatically attached to a transfer-conveying belt 216 which is stretched out to extend in substantially parallel between a driving roller 214 and a driven roller 215. And a pattern image-detecting unit is disposed adjacent to and below the transfer-conveying belt 216.

Furthermore, a fixing device 217 is disposed downstream of the transfer-conveying belt mechanism 213 in a paper path. The fixing device 217 is used for fixing to the sheet P a toner image which has been transferred onto the sheet P. The sheet P passes through a nip area between a pair of fixing rollers in the fixing device 217, and then passes through a conveyance direction-switching gate 218, thereafter being discharged by discharge rollers 219 onto a catch tray 220 which is mounted on an exterior wall of the copier body 11.

The switching gate 218 is used to selectively switch the conveyance path of the sheet P having the toner image fixed thereon, between a path for discharging the sheet P from the copier body 11 and a path for feeding the sheet P back to the image forming section 210. As a result of the above switching operation of the switching gate 218, the sheet P which is to be conveyed back to the image forming section 210, is reversed through a switch-back paper path 221, thereafter being fed back to the image forming section 210.

Moreover, above the transfer-conveying belt 216 in the image forming section 210, a first image forming station Pa, a second image forming station Pb, a third image forming station Pc, and a fourth image forming station Pd are arranged, adjacent to the transfer-conveying belt 216, sequentially from an upstream side in the paper path.

The transfer-conveying belt 216 is frictionally driven by the driving roller 214 in an arrow Z direction in FIG. 1 and carries the sheet P which is fed through the paper-feed mechanism 211 as mentioned above, thereby conveying the sheet P to the image forming stations Pa to Pd in sequence.

The image forming stations Pa, Pb, Pc, and Pd have substantially the same configuration. The image forming Stations Pa, Pb, Pc, and Pd include photoreceptor drums 222a, 222b, 222c, and 222d, respectively, which rotate in an arrow F direction in FIG. 1.

Around the photoreceptor drums 222a, 222b, 222c, and 222d, there are chargers 223a, 223b, 223c, and 223d; developing devices 224a, 224b, 224c, and 224d; transferring dischargers 225a, 225b, 225c, and 225d; and cleaning devices 226a, 226b, 226c, and 226d, which are sequentially disposed along a direction of rotation of the photoreceptor drums 222a to 222d. The chargers 223a to 223d uniformly charge the photoreceptor drums 222a to 222d, respectively. The developing devices 224a to 224d develop respective electrostatic latent images formed on the photoreceptor drums 222a to 222d. The transferring dischargers 225a to 225d transfer onto the sheet P the toner images developed on the photoreceptor drums 222a to 222d. The cleaning devices 226a to 226d remove the toner remaining on the photoreceptor drums 222a to 222d.

Further, above the photoreceptor drums 222a, 222b, 222c, and 222d, there are disposed laser beam scanner units 227a, 227b, 227c, and 227d, respectively. Each of the laser beam scanner units 227a to 227d is composed of an image data output section 42 (refer to FIG. 2), a polygon mirror (deflecting device) 240, a fθ lens 241, and a mirror 242, a mirror 243, and the like component. The image data output section 42 includes a semiconductor laser element which emits dot light modulated according to image data. The polygon mirror 240 is used to deflect in a main scanning direction the laser beam which comes from the semiconductor laser element. The fθ lens 241 and the mirrors 242, 943 are used to focus on surfaces of the photoreceptor drums 222a to 222d the laser beams deflected by the polygon mirror 240 so that images are formed on the surfaces of photoreceptor drums 222a to 222d.

A pixel signal corresponding to an image part of black component in a color document image is inputted to the laser beam scanner unit 227a. A pixel signal corresponding to an image part of cyan component in a color document image is inputted to the laser beam scanner unit 227b. A pixel signal corresponding to an image part of magenta component in a color document image is inputted to the laser beam scanner unit 227c. And a pixel signal corresponding to an image part of yellow component in a color document image is inputted to the laser beam scanner unit 227d.

As a result, electrostatic latent images corresponding to color-converted document image information are formed on the respective photoreceptor drums 222a to 222d. The developing device 224a contains a toner of black color. The developing device 224b contains a toner of cyan color. The developing device 224c contains a toner of magenta color. The developing device 224d contains a toner of yellow color. The electrostatic latent images on the photoreceptor drums 222a to 222d are developed with use of the above toners of respective colors. In the image forming section 210, the image is thus reproduced, as toner images or respective colors, from the color-converted document image information.

Further a sheet-attachment charger 228 is disposed between the first image forming station Pa and the paper-feed mechanism 211. The sheet-attachment charger 228 charges a surface of the transfer-conveying belt 216 so that the sheet P supplied from the paper-feed mechanism 211 is steadily attached onto the transfer-conveying belt 216 and in such a state, conveyed from the first image forming station Pa to the fourth image forming section Pd without going off its track.

On the opposite side, an electricity-removing device 229 is disposed almost immediately above the driving roller 214 between the fourth image forming station Pd and the fixing device 217. To the electricity-removing device 229 is applied AC voltage for detaching from the transfer-conveying belt 216 the sheet P electrostatically attached thereto.

In the digital color copier 1 configured as above, cut-sheet paper is used as the sheet P. The sheet P is fed from a paper-feed cassette and supplied into a guide of paper-conveyance path in the paper-feed mechanism 211. At the time, a peripheral part of the sheet P is detected by a sensor (not shown). On the basis of a detection signal outputted from the sensor, the pair of registration rollers 212 stops the sheet P therebetween.

And at the time adjusted with the respective image forming stations Pa to Pd, the sheet P is delivered onto the transfer-conveying belt 216 which rotates in the arrow Z direction in FIG. 1. At the time, the transfer-conveying belt 216 is charged with a predetermined potential by the sheet-attachment charger 228 as described above, with the result that that the sheet P is stably conveyed through the respective image forming stations Pa to Pd.

In the respective image forming stations Pa to Pd, the toner images of respective colors are formed to be combined with each other on a support surface of the sheet P which is electrostatically attached to and thus conveyed by the transfer-conveying belt 216. After the image has been transferred onto the sheet P in the fourth image forming station Pd, the electricity-removing device peels the sheet P off the transfer-conveying belt 216 sequentially from the peripheral part of the sheet P to thereby lead the sheet P to the fixing device 217. Lastly, the sheet P on which the toner image is fixed is discharged from a sheet-discharge port (not shown) onto the catch tray 220.

Note that in the above descriptions, optical writing on the photoreceptor drums 222a to 222d is carried out by causing the laser beam scanner units 227a to 227d to scan the photoreceptor drums 222a to 222d respectively with laser beams to which the photoreceptor drums 222a to 222d are exposed. In another embodiment of the invention, the laser beam scanner unit may be replaced by a writing optical system (LED head) which is composed of a light-emitting diode array and an imaging lens array. The LED head is smaller and silent with no movable part as compared to the laser beam scanner unit. Accordingly, the LED head can be favorably used in an image forming apparatus represented by a digital color copier of tandem type which requires a plurality of optical writing units.

Figure 2:
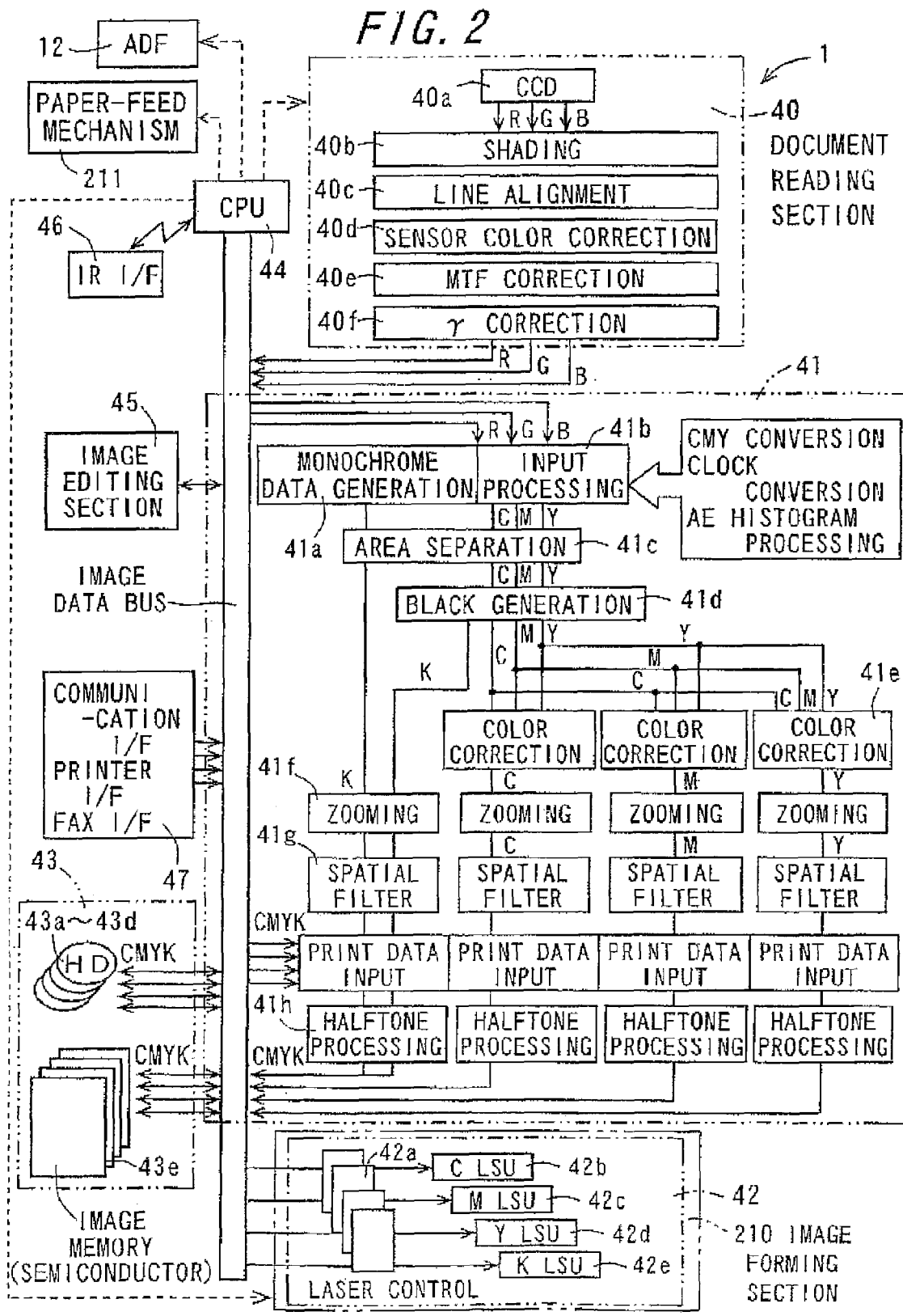
FIG. 2 is a block diagram showing an electrical configuration of the digital color copier.

FIG. 2 is a block diagram showing an electrical configuration of the digital color copier 1. Other than the document reading section 40, the ADF 12, the paper-feed mechanism 211, and the image forming section 210, the digital color copier 1 includes an image processing section 41, an image memory 43, an image data output section 42, a central processing unit (abbreviated as CPU) 44, an image editing section 45, and external interface sections 46, 47. The image memory 43 is constituted by a hard disk device, a random access memory (abbreviated as RAN), or the like.

The document reading section 40 includes a CCD line sensor 40a, a shading correction circuit 40b, a line alignment portion 40c, a sensor color-correcting portion 40d, a modulation transfer function (abbreviated as MTF)-correcting portion 40e, and a γ-correcting portion 40f. The CCD line sensor 40a is a three-line CCD line sensor capable of reading a monochrome or color document image and outputting line data composed of separated color components of R, G, and B. The shading correction circuit 40b corrects a line image level of the line data read by the CCD line sensor 40a. The line alignment portion 40c is represented by a line buffer which corrects misalignment of the image line data read by the three-line CCD line sensor 40a. The sensor color-correcting portion 40d corrects color data of the line data of respective colors outputted from the three-line CCD line sensor 40a. The MTF-correcting portion 40e performs correction to give contrast in variations in signals of respective pixels. The γ-correcting portion 40f corrects the brightness of the image to correct the luminous efficiency.

The image forming section 41 includes a monochrome data-generating portion 41a, an input-processing portion 41b, an area-separating portion 410c a black-generating portion 41d, a color-correcting circuit 41e, a zooming circuit 41f, a spatial filter 41g, and a halftone processing portion 41h. The monochrome data-generating portion 41a generates monochrome data (black-and-white document) based on color image signals, i.e., RGB signals (RGB image data) inputted from the document reading section 40. The input-processing portion 41b converts the RGB signals into YMC signals (YMC image data) adaptable to various recording portions in a recording device, and performs clock conversion. The area-separating portion 41c separates the inputted image data into a character area, a dot photograph, and a photograph on printing paper. The black-generating portion 41d performs base color-removing process based on the YMC signals outputted from the input-processing portion 41b to thereby generate a black color. The color-correcting circuit 41e adjusts the respective colors of the color image signals based on conversion tables of respective colors. The zooming circuit 41f converts the magnification of the inputted image data based on preset magnification. The halftone processing portion 41h is adapted to express the tone reproduction property by using a multi-level error diffusing method, a multi-level dither method, or the like method.

The image data of respective colors treated with the halftone process is stored once in the image memory 43. The image memory 43 includes four hard disks (rotary recording medium) 43a, 43b, 43c, and 43d which sequentially receive 8-bit image data of four colors (32 bit) serially outputted from the image processing section 41 and bring the 32-bit image data to a buffer where the 32-bit image data is temporarily stored and converted into 8-bit image data of four colors, then storing and thus managing the converted imaged data for each color. Since the respective image forming stations are located at different positions, the image data of the respective colors is stored once in a delay buffer memory (semiconductor memory) 43*e* of the image memory 43 to adjust the time at which the image data is sent to the respective laser scanner units, thereby preventing the color misalignment from appearing on the printed image. The image memory 43 furthermore includes an image-combining memory 43*f* for combining a plurality of images.

The image data output section 42 include a laser control unit 42*a* and laser scanner units 42*b*, 42*c*, 42*d*, and 42*e* of the respective colors. The laser control unit 42*a* modulates the pulse width based on the image data of the respective colors sent from the halftone processing portion 41*h*. The laser scanner units 42*b*, 42*c*, 42*d*, and 42*e* perform laser recording based on the pulse width-modulated signals according to the image data of the respective colors outputted from the laser control units 42*a*.

In response to a command which may be given by an operation panel, the central processing unit 44 controls the document reading section 40, the ADF 12, the paper-feed mechanism 211, the image forming section 210, the image processing section 41, the image memory 43, the image data output section 42, the later-described image editing section 45, and the external interface (I/F) sections 46, 47 on the basis of a predetermined sequence.

The image editing section 45 performs a predetermined image editing on the image data which have been sent through the document reading section 40, the image processing section 41, or the later-described interface section, and is temporarily stored in the image memory 43. The editing operation of the image data is performed using the image combining memory 43*f*.

The IR interface section 46 serving as an external interface section is a communication interface section for receiving image data coming from an image input-processing unit which is separately provided outside the digital color copier 1. The image input-processing unit includes, for example, a communication mobile terminal, a digital camera, and a digital video camera.

The image data inputted from the IR interface section 46 is also inputted to the image processing section 41 once, to be then subjected to the color space correction or the like, thereby being converted into image data at such a level as to be manageable with the image forming section 210 of the digital color copier 1. The image data will be thus stored and managed in the hard disks 43*b*, 43*c*, 43*d*, and 43*e*.

Furthermore, the communication/printer/fax interface section 47 serving as an external interface section functions as a printer interface for inputting image data created by a personal computer 2 and functions also as a monochrome or color fax interface for receiving image data sent by fax. The image data inputted from the communication/printer/fax interface section 47 have already been in form of CMYK signals which will be subjected to the halftone processing, thereafter being once stored and managed in the hard disks 43*b*, 43*c*, 43*d*, and 43*e* of the image memory 43.

Figure 3:
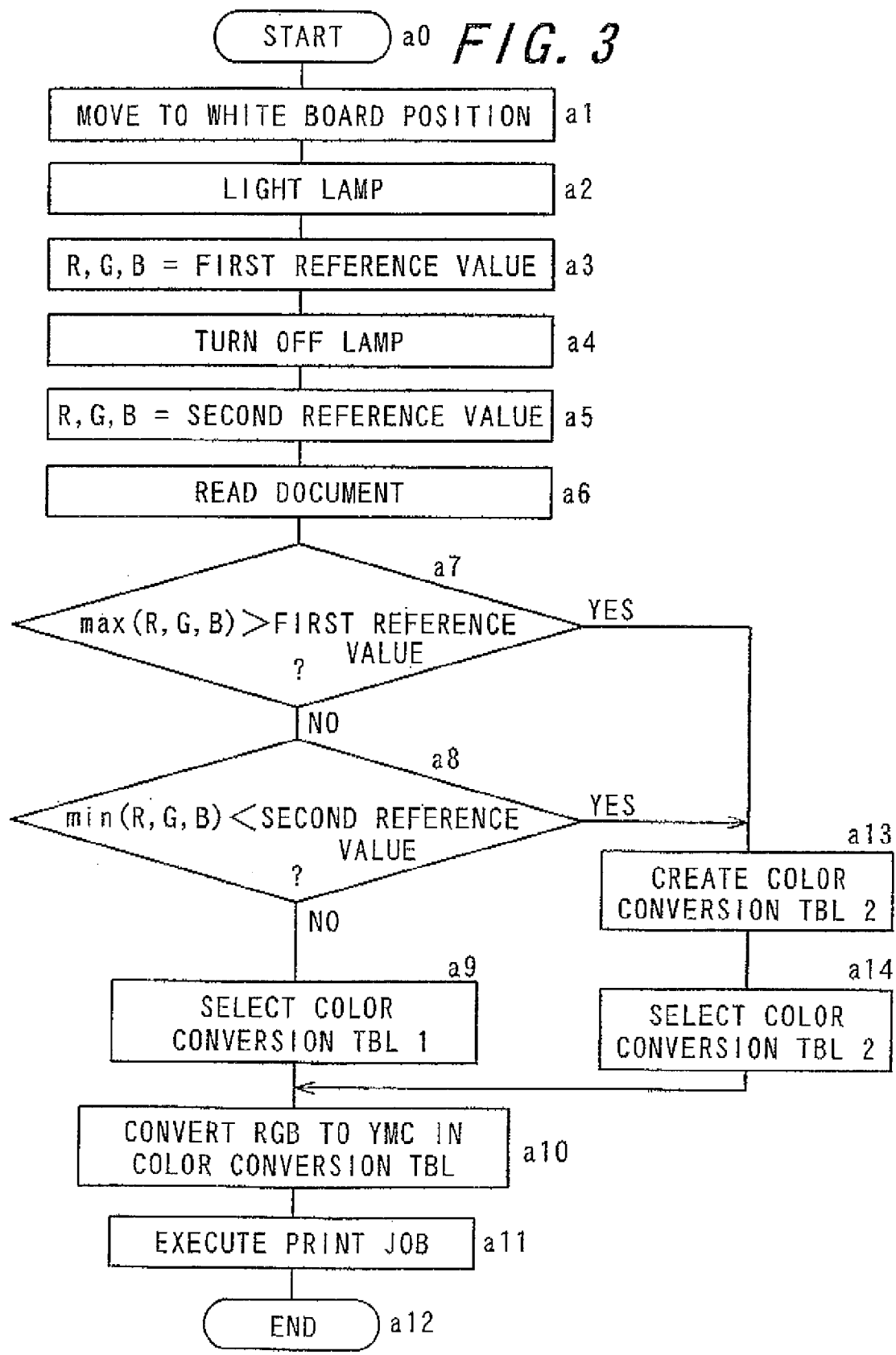
FIG. 3 is a flowchart showing a color conversion process in the digital color copier 1.

FIG. 3 is a flowchart showing a color conversion process in the digital color copier 1. The color conversion process is an image processing method according to one embodiment of the invention.

An input of a print command from the operation panel initiates the color conversion process. At the time, the process proceeds from Step a0 to Step a1 whereby the process starts. At Step a1, the CPU 44 controls the first scanning units 113 and the second scanning units 114 in the document reading section 40 so that the first scanning unit 113 mores to a position opposite to the white board. The process then proceeds to Step a2.

At Step a2, the CPU 44 lights an exposure lamp in the document reading section 40. The process then proceeds to Step a3.

At Step a3, the shading correction circuit 40*b* corrects image data represented according to RGB color system (hereinafter referred to as RGB image data) so that tone values of R, G and B reach predetermined first reference values which are smaller than the maximum tone values. The process then proceeds to Step a4. Note that the RGB image data have been photoelectrically converted and outputted by the CCD line sensor 40*a* in the document reading section 40. In the present embodiments the RGB image data is composed of 8-bit images of respective colors. That is to say, the number of tones for each color is 256. Accordingly, in the embodiment, the maximum tone value is 255 while the minimum tone value is zero. Moreover, in the embodiment, the tone value for white is selected so as to be larger than the tone value for black, and the first reference value of the tone value for white is predetermined to be 230. At Step a3, the tone values serving as a reference of white, i.e., such tone values of R, G and B as to represent white are determined.

At Step a4, the CPU 44 turns off the exposure lamp in the document reading section 40. The process then proceeds to Step a5.

At Step a5, the shading correction circuit 40*b* corrects the RGB image data which have been photoelectrically converted and outputted by the CCD line sensor 40*a* in the document reading section 40, so that tone values of R, G and B reach predetermined second reference values which are larger than the minimum tone values. The process then proceeds to Step a6. In the embodiment, the minimum tone value is zero as mentioned above, and the second reference value is predetermined to be 15. At Step a5, the tone values serving as a reference of black, i.e., such tone values of R, G and B as to represent black are determined.

At Step a6, the CPU 44 controls the document reading section 40 so that the document is read by the document reading section 40. The process then proceeds to Step a7. The tone values of R, G and B for respective pixels of image data on the read document is corrected by the shading correction circuit 40*b* so as to be 15 to 230 basically. This enables to secure a marginal region for absorbing variation that may be generated in output values of the reading device due to electrical noise, a change of supply voltage, etc. when the document is being read.

In some cases, the shading correction circuit 40*b* fails to make complete adjustment due to the electrical noise, the change of supply voltage, the fluorescent color, the whiteness degree of sheet, and the like element, in a consequence whereof tone values out of the range between the predetermined first and second reference values may be given. In such a case, the document reading section 40 will output the tone values out of the range between the predetermined first and second reference values.

The respective image data of R, G and B whose tone values have been corrected by the shading correction circuit 40*b* is outputted from the document reading section 40 after treated by the line alignment portion 40*c*, the sensor color-correcting portion 40*d*, the modulation transfer function (abbreviated as MTF)-correcting portion 40*e*, and the γ-correcting portion 40*f*. The line alignment portion 40*c* is represented by a line buffer which corrects misalignment of the image line data read by the CCD line sensor 40*a*. The sensor color-correcting portion 40*d* corrects color data of the line data of respective colors outputted from the COD line sensor 40a. The MTF-correcting portion 40e performs correction to give contrast in variations in signals of respective pixels. The γ-correcting portion 40f corrects the brightness of the image to correct the luminous efficiency.

The CPU 44 controls the document reading section 40 so that the RGB image data obtained from the read document is sent to the input-processing portion 41b.

At Step a7, the input-processing portion 41b determines whether or not at least any one of the output values of the document reading section 40 when the document is read, that is to say, at least any one of the respective tone values of R, G and B in the image data exceeds the above-mentioned predetermined first reference value (hereinafter referred to simply as "first reference value"). When the input-processing portion 41b determines at Step a7 that none of the tone values exceed the first reference value, the process then proceeds to Step a8. At Step a7, the input-processing portion 41b compares the first reference value with the respective maximum values of the tone values of R, G and B in the image data given by the document reading section 40. The maximum value of R, the maximum value of G, and the maximum value of B may be, for example, determined for every image data which correspond to one sheet of documents, or determined for every job performed on an image to be printed.

At Step a8, the input-processing portion 41b determines whether or not at least any one of the output values of the document reading section 40 when the document is read, that is to say, at least any one of the tone values of R, G and B in the image data is smaller than the above-mentioned predetermined second reference value (hereinafter referred to simply as "second reference value"). When the input-processing portion 41b determines at Step a8 that none of the tone values are not smaller than the second reference value, the process then proceeds to Step a9. At Step a8, the input-processing portion 41b compares the second reference value with the respective minimum value of the tone values of R, G and B in the image data given by the document reading section 40. The minimum value of R, the minimum value of G, and the minimum value of B may be, for example, determined for every image data which correspond to one sheet of documents, or determined for every job performed on an image to be printed. Note that the above minimum values are determined based on a range of image data equal to the range based on which the above maximum values have been determined.

At Step a9, the input-processing portion 41b selects a first color conversion table (TBL1) which has been stored in advance. The process then proceeds to Step a10. The first color conversion table TBL1 has been stored in the memory.

At Step a10, the input-processing portion 41b converts the RGB image data into the YMC image data by using the selected color conversion table (TBL). The process then proceeds to Step a11.

At Step a11, the CPU 44 executes the print job with use of the YMC image data treated by the image processing section 41. That is to say, the CPU 44 performs the printing operation by controlling the image memory 43, the image forming section 210, and the paper-feed mechanism 211. The process then proceeds to Step a12 where the operational process comes to an end.

When the input-processing portion 41b determines at Step a7 described above that among the output values of the document reading section 40 when the document is read, any of the tone values of image data of R, G and B exceeds the above-stated first reference value, the process then proceeds to Step a13. When the input-processing portion 41b determines at Step as described above that among the output values of the document reading section 40 when the document is road, any of the tone values of image data of R, G and B is smaller than the above-stated second reference value, the process then proceeds to Step a13. At Step a13, an expanding process is carried out, that is to say, a second color conversion table TBL2 is created based on the first color conversion table TBL1. The process then proceeds to Step a14. The expanding process will be explained in detail in later descriptions concerning FIG. 7.

At Step a14, the input-processing portion 41b selects the second color conversion table TBL2 created at Step a8. The process then proceeds to Step a10. The second color conversion table TBL2 created at Step a13 has been temporarily stored in the memory.

FIG. 4 is a view showing a color space of RGB color system. FIGS. 5A to 5D are views each of which shows one example of a part of the color conversion table TBL. FIG. 5A is a view showing one example of the first color conversion table TBL1-1 which represents gray. FIG. 5B is a view showing one example of the first color conversion table TBL1-2 which represents red. FIG. 5C is a view showing one example of the second color conversion table TBL2-1 which represents gray. FIG. 5D is a view showing one example of the second color conversion table TBL2-2 which represents red. The first color conversion tables TBL1-1 and TBL1-2 axe collectively referred to simply as the first color conversion table TBL1. The second color conversion tables TBL2-1 and TBL2-2 are collectively referred to simply as the second color conversion table TBL2. The first color conversion table TBL1 and the second color conversion table TBL2 are collectively referred to simply as the color conversion table TBL.

The first color conversion table TBL1 is created by associating a plurality of block regions sectioned in the color space of RGB color system respectively with the predetermined tone values of Y (yellow), M (magenta) and C (cyan). In the first color conversion table TBL1, the respective regions are represented based on the predetermined N number of grid points for R, G and B since associations for every tone from the tone value zero to the tone vale 255 for R, G and B with the predetermined tone values of Y, M and C will lead to enormous data quantity. In the present embodiment, the predetermined number N is selected to be 24. The tone values of R, G and B in the color space of the RGB color system correspond to any of 24×24×24 grid points GP. An R-axis position of the gird point GP is denoted by GPr. A G-axis position of the grid point GP is denoted by GPg. And a B-axis position of the grid point GP is denoted by GPb. A position of the grid point GP in the color space of RGB color system is therefore indicated by (GPr, GPg, GPb).

Figure 6:
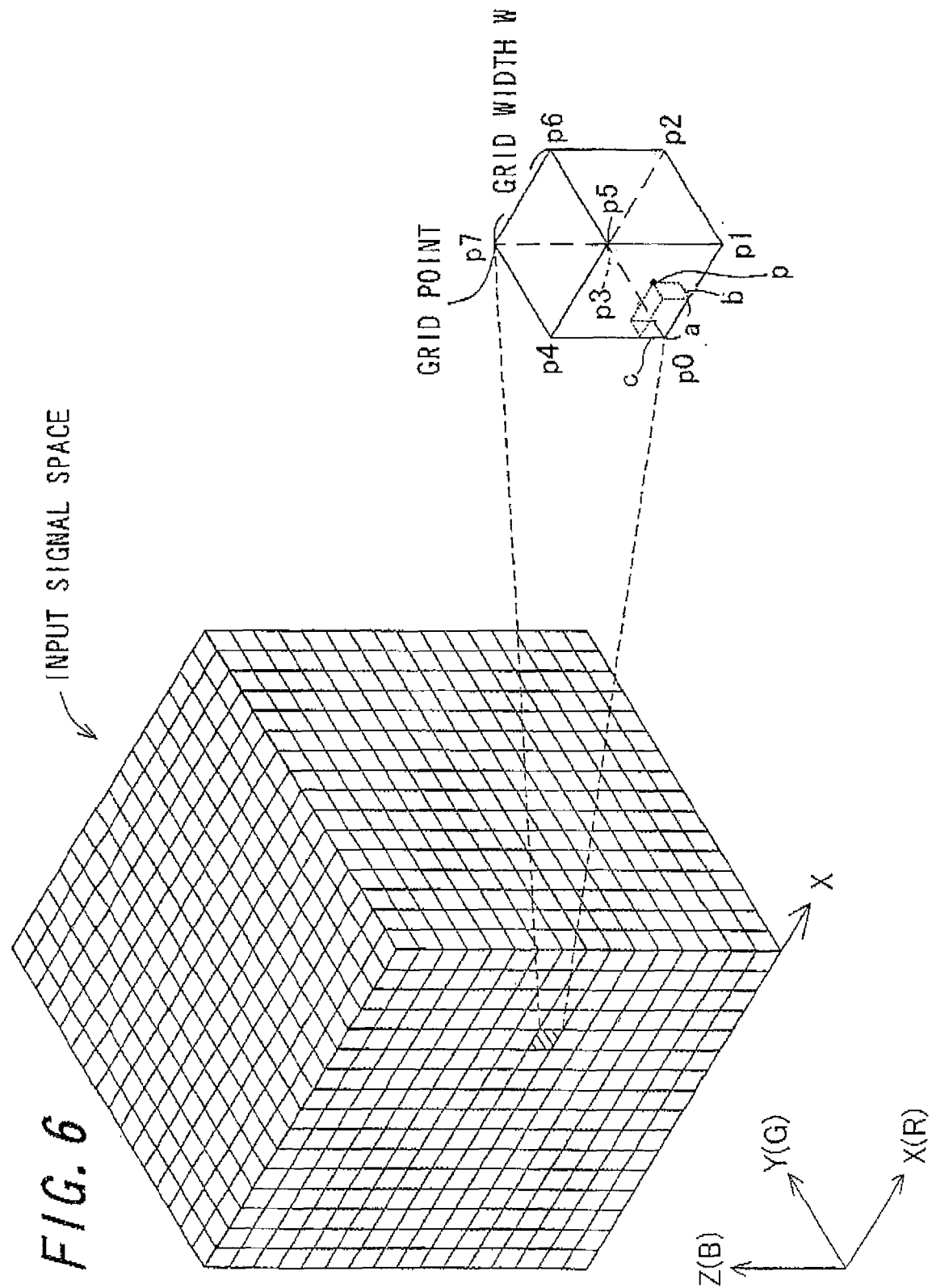
FIG. 6 is a view of assistance in explaining an eight-point interpolation.

Each of the grid points GP correspond to a plurality of the tone values for R, C and B. On the basis of the respective grid points GP, representative tone values of R, G and B are associated with the predetermined tone values of Y, M and C. The representative tone values of R, G and B represent a plurality of the tone values of R, G and B included in the regions corresponding to the grid points. In many cases, the respective tone values of R, G and B outputted from the CCD line sensor 40a to the shading correction circuit 40b are not equal to the above mentioned tone values corresponding to the grid points GP, and it is therefore determined in a three-dimensional complement process, to which grid point GP the tone values belong. To be more specific, an eight-point interpolation is carried out in the three-dimensional complement process. FIG. 6 is a view of assistance in explaining the eight-point interpolation. An input signal space shown in FIG. 6 corresponds to the color space of RGB color system, and the X axis, Y axis, and Z axis which are orthogonal to each other, correspond to the R axis, G axis, and B axis, respectively. As shown in FIG. 6, in a grid space enclosed by eight grid points $p_0$ to $p_7$ which are respectively the grid points GP adjacent to each other, image data p is specified in the input signal space by using a, b and c which respectively indicate ratios relative to a grid width W inside the grid space with reference to the gird point $p_0$ where the tone values of R, G and B are the smallest. In this case, an interpolated value f(p) of the eight-point interpolation is represented as follows:

$$f(p) = (1-a)(1-b)(1-c) \cdot f(p_0) + a(1-b)(1-c) \cdot f(p_1) +$$
$$ab(1-c) \cdot f(p_2) + (1-a)b(1-c) \cdot f(p_3) + (1-a)(1-b)c \cdot f(p_4) +$$
$$a(1-b)c \cdot f(p_5) + abc \cdot f(p_6) + (1-a)bc \cdot f(p_7)$$

wherein $f(p_i)$ represents a table value at a point pi.

The number of grid points GP is determined depending on balance between a production cost and storage capacity of the memory for storing the color conversion table. In the case where the tone values of R, G and B are zero to 255, 24 or more grid points GP for each of R, G and B is enough to prevent the tone reproducibility from deteriorating.

The first color conversion table TBL1 is created individually in accordance with the digital color copier 1 so as to match the RGB color system with the YMC color system. That is to say, the document is read by the document reading section 40 and printed by the image forming section 210, thereby associating the respective grid points GP with the predetermined tone values of Y, M and C so that the tone reproducibility becomes favorable.

For example, please refer to FIG. 5A. The tone values are larger than the first reference values in regions indicated by GPr=Gg=GPb=21, GPr=GPg=GPb=22 and GPr=GPg=GPb=23 which are based on the respective grid points GP for R, G and S. In these regions, the tone values of Y, M and C are all zero. Moreover, the tone values are less than the second reference values in regions indicated by GPr=GPg=GPb=0 and GPr=GPg=GPb=1 which are based on the respective grid points GP for R, G and B. In these regions, the tone values of Y, M and C are all 255.

Next, please refer to FIG. 5B, for example, the tone value of R exceeds the first reference value while the tone values of G and B are equal to or less than the tone value larger than the first reference value, in regions indicated by GPr=21, GPr=22 and GPr=23 which are based on the grid point GP for R, and GPg=GPb=0 which are based on the gird points GP for G and B. In these regions, the tone values of Y and M are both zero, and the tone value of C is 255. Moreover, the tone values are less than the second reference values in regions indicated by GPg=GPb=0 which are based on the grid points GP for G and B, and GPr=0 and GPr=1 which are based an the grid point GP for R. In these regions, the tone values of Y and M are both zero, and the tone value of C is also zero.

When the first color conversion table TBL1 is selected at Step a9 as described above, the input-processing portion 41b performs the color conversion at Step a10 with use of the first color conversion table TBL1 shown in FIGS. 5A to 5B. For example, in the case where tone values of R, G and B for a certain pixel in the image data given by the document reading section 40 are respectively 144, the input-processing portion 41b outputs tone values 107, respectively, of Y, M and C for the pixel.

The shading correction circuit 40b performs such shading correction that tone values of R, G and B are adjusted to the first reference value (230 in this case) when white is read, and tone values of R, G and B are adjusted to the second reference value (15 in this case) when black is read. Such shading correction causes color misalignments upon the color conversion around the first and second reference values, for example, in the region A in FIG. 4, when a tone value of given image data is out of the range from the first reference value to the second reference value. To deal with the above problem, such second color conversion tables TBL2 as shown in FIG. 5C and FIG. 5D are created at Step a13 in the above-described flowchart in FIG. 3 so that the tone reproducibility is not decreased even when the tone value of given image data is out of the range from the first reference value to the second reference value.

FIG. 7 is a flowchart for showing an expanding process operated by the input-processing portion 41b. At step a13 in FIG. 3, the process proceeds from Step b0 to Step b1 at which the expanding process starts. At Step b1, the maximum value P1 is determined among the tone values of R, G and B of the inputted image data. The process then proceeds to Step b2.

At Step b2, in the first color conversion table TBL1, a range to be expanded is specified between the tone values of R, G and B close to the first reference value, and the tone values of R, G and 3 at a predetermined third reference value (hereinafter referred to as "third reference value") which is smaller than the first reference value by a predetermined value R1. The range included in the respective regions of RGB color system based on the respective grid points GP is expanded so that the grid points GP corresponding to the first reference value through the third reference value cover the range between the above maximum value P1 and the third reference value. That is to say, expanded is the range which is included in the regions of RGB color system associated respectively with the predetermined tone values of Y, M and C. In the embodiment, the predetermined value R1 is set at 30, and the third reference value thus becomes 200. In the embodiment, the grid points GP corresponding to the first reference value through the third reference value are located at positions "18" to "21" and as shown in FIG. 5C and FIG. 5D, differences among the representative tone values of R, G and B corresponding to the values of grid points "18" to "21" are respectively expanded by about two to five tones.

In the expanding process around the first reference value, the following formula (1) is used. In the formula (1), T1 represents a new tone value corresponding to the grid point GP for the region to be expanded; INT represents rounding-off to the nearest integer; P1 represents the maximum value of the tone values of R, G and B of the inputted image data; and GP represents the value of grid point corresponding to the region to be expanded.

$$T1 = INT[(P1-199)/3 \times (GP-18)+199] \quad (1)$$

In the input-processing portion 41b, the new tone value determined by the formula (1) is associated with the grid point GP corresponding to the region to be expanded, and in the first color conversion tables TBL1 shown in FIG. 5A and FIG. 5B, for example, the region B is subjected to the expanding process. For example, in the case where the maximum value P1 is 245, the second color conversion tables TBL2 shown in FIG. 5C and FIG. 5D are created by expanding the ranges included in the regions of RGB color system based on the grid points GP corresponding to the tone values of R, G and B between 230 and 200, i.e., the values of grid points 18 to 21.

At Step b3, the minimum value P2 is determined among the tone values of R, G and R in the inputted image data. The process then proceeds to Step b4.

Next, at Step b3, in the first color conversion table TBL1, a range to be expanded is specified between the tone values of R, G and B close to the second reference value, and the tone values of R, G and B at a predetermined fourth reference value (hereinafter referred to as "fourth reference value") which is larger than the second reference value by a predetermined value R2. The range included in the respective regions of RGB color system based on the respective grid points GP is expanded so that the grid points GP corresponding to the second reference value through the fourth reference value cover the range between the above minimum value P2 and the fourth reference value. That is to say, expanded is the range which is included in the regions of RGB color system associated respectively with the predetermined tone values of Y, M and C. In the embodiment, the predetermined value R2 is set at 35, and the fourth reference value thus becomes 50. In the embodiment, the grid points GP corresponding to the second reference value through the fourth reference value are located at positions "2" to "5" and as shown in FIG. 5C and FIG. 5D, differences among the representative tone values of R, G and B corresponding to the values of grid points "2" to "5" are respectively expanded by about two to five tones.

In the expanding process around the second reference value, the following formula (2) is used. In the formula (2), T2 represents a new tone value corresponding to the grid point GP for the region to be expanded; INT represents rounding-off to the nearest integer; P2 represents the minimum value of the tone values of R, G and B of the inputted image data, and GP represents the value of grid point corresponding to the region to be expanded.

$$T2=INT[(55-P2)/3\times(GP-2)+P2] \qquad (2)$$

In the input-processing portion 41b, the new tone value determined by the formula (2) is associated with the grid point GP corresponding to the region to be expanded, and in the first color conversion tables TBL1 shown in FIG. 5R and FIG. 5B, for example, the region C is subjected to the expanding process. For example, in the case where the minimum value P2 is 5, the second color conversion tables TSL2 shown in FIG. 5C and FIG. 5D are created by expanding the ranges included in the regions of RGB color system based on the grid points GP corresponding to the tone values of R, G and B between 15 and 50, i.e., the values of grid points 2 to 5.

When Step b4 is completed, the expanding process comes to an end. The process then proceeds to Step a14 in the flowchart in FIG. 3.

In the embodiment, in the case where an output value of the document reading section 40 for at least any of R, G and B is out of the range between the above first reference value and the above second reference value due to a change in the output value of the reading device caused by the electrical noise, the change of supply voltage, etc. when the document is being read, the second color conversion table TBL2 is created in accordance with the above change by expanding the ranges in the first color conversion table TBL1, which ranges are around the predetermined first and second reference values and included in the regions of RGB color system associated respectively with the predetermined tone values of Y, M and C. Using the second color conversion table thus obtained, the color conversion is carried out from the RGB color system into the YMC color system.

In the manner stated above, the output value of the document reading section 40 is prevented from being out of the regions of the RGB color system, and therefore able to be included in any of the regions. Further, the regions are associated respectively with the predetermined tone values of Y, M and C, thus allowing for the conversion into the image data of the YMC color system. A correction can be therefore carried out so as to reduce color misalignments which are generated easily around the maximum tone value and the minimum tone value among the tone values of R, G and B in the image data of RGB color system being converted into the YMC image data. As a result, it is possible to obtain images which exhibit high tone reproducibility.

Further, in the embodiment, the color misalignment caused by the expansion can be minimized by setting, as the to-be-expanded range, the range closer to the first reference value in relation to the predetermined third reference value which is smaller than the first reference value by the predetermined value and which is closer to the second reference value in relation to the first reference value. It is thus possible to obtain images which exhibit higher tone reproducibility.

Further, in the embodiment, each region of the RGB color system covers not a single but a plurality of the tone values of R, G and B. Accordingly, in the color conversion table TBL, the RGB-CMY association is established such that the tone values of R, G and B included in the plurality of the predetermined tone values are converted into a single tone value of C, M and Y. Since the respective block regions sectioned in the color space of RGB color system are associated with the predetermined values of YMC color system, the required number of YMC tone values in the color conversion table TBL is equal to the number of above block regions, thus allowing for the color conversion table with smaller data quantity.

Further, in the embodiment, the hue can be maintained by selecting such a range included in the regions of RGB color system that the maximum value of the tone values of RGB color system after the expansion is the maximum value of R, G and B among the values outputted from the reading device when the document is read. As a result, it is possible to obtain images which exhibit still higher tone reproducibility.

Further, in the embodiment, the first color conversion table TBL1 and the second color conversion table TBL2 indicate that the predetermined tone values of the Y, M and C are associated with even the regions of color space of RGB color system where the tone values of R, G and B are out of the range between the first reference value and the second reference value. That is to say, the representative tone values of R, G and B are associated with the tone values of Y, M and C even for the grid points GP located at positions "21", "22", "23" and "C", "1". Accordingly, even in the second color conversion table TBL2 created when at least any one of the tone values of R, G and B is out of the range between the first reference value and the second reference value, the representative tone values of R, G and B are associated with the tone values of Y, M and C for the grid points GP located at the positions "21", "22", "23" and "0", "1", so that inputted image data having unexpected tone values can also be treated.

Further, in the embodiment, the second color conversion table TBL2 is created based on the first color conversion table TBL1. It is therefore not necessary to secure a storage region for storing the second color conversion table TBL2 in advance.

Although the second color conversion table TBL2 is created in the embodiment, the second color conversion table TBL2 may also be stored in the memory in advance. In this case, the time for creating the color conversion table TBL is shortened in a consequence whereof the length of time required for the color conversion process can be shorter than that in the above embodiment.

FIGS. 8A to 8D are views each of which shows one example of a part of a color conversion table TBL according to another embodiment of the invention. The present embodiment and the above embodiment are different front each other only in the color conversion table TBL with the other configurations identical to each other, so that corresponding parts will be denoted by the same reference numerals while only different parts will be described. FIG. 8A is a view showing one example of the first color conversion table TBL1-3 which represents gray. FIG. 8B is a view showing one example of the first color conversion table TBL1-4 which represents red. FIG. 8C is a view showing one example of the second color conversion table TBL2-3 which represents gray. FIG. 8D is a view showing one example of the second color conversion table TBL2-4 which represents red. The first color conversion tables TBL1-3 and TBL1-4 are collectively referred to simply as the first color conversion table TBL1. The second color conversion tables TBL2-3 and TBL2-4 are collectively referred to simply as the second color conversion table TBL2. The first color conversion table TBL1 and the second color conversion table TBL2 are collectively referred to simply as the color conversion table TBL.

In the first color conversion table TBL1 according to the embodiment the predetermined tone values of Y, M and C are associated with only the regions of color space of RGB color system where the tone values of R, G and B are included in the range between the first reference value and the second reference value. The first color conversion tables TBL in FIG. 8A and FIG. 8B are examples where the first reference value is 230 and the second reference value is 15. In the first color conversion table, the first reference value corresponds to the value 23 of grid point GP, and tone values over the first reference value are associated with none of the tone values of Y, M and C while the second reference value corresponds to the value zero of grid point GP, and tone values less than the second reference value are associated with none of the tone values of Y, M and C.

The creation of the second color conversion table in the present embodiment is the same as that in the above embodiment except that for the expanding process, the above formula (1) is replaced by the following formula (3) and the above formula (2) is replaced by the following formula (4) in the present embodiment.

$$T1=INT[(P1-201)/3\times(GP-20)+201] \quad (3)$$

$$T2=INT[(52-P2)/4\times GP+P2] \quad (4)$$

The formula (3) and the formula (4) enable to create detailed tables.

FIG. 8C and FIG. 8D show the second color conversion tables TBL2 when the maximum value P1 is 245 and the minimum value P is 15. As in the case of the first color conversion table TBL1, in the second color conversion table TBL2, the predetermined tone values of Y, M and C are associated in the range between the maximum value P1 and the minimum value P2. That is to say, the maximum value P1 corresponds to the maximum value of possible tone values of Y, M and C, and the minimum value P2 corresponds to the minimum value of possible tone values of Y, M and C. The color conversion table TBL is created as above and therefore, a more detailed color conversion table can be created in the embodiment by decreasing the range or each of Y, M and C, for a single tone value, which is included in the range between the first reference value and the second reference value. It is thus possible to obtain images which exhibit higher tone reproducibility.

Figure 9:
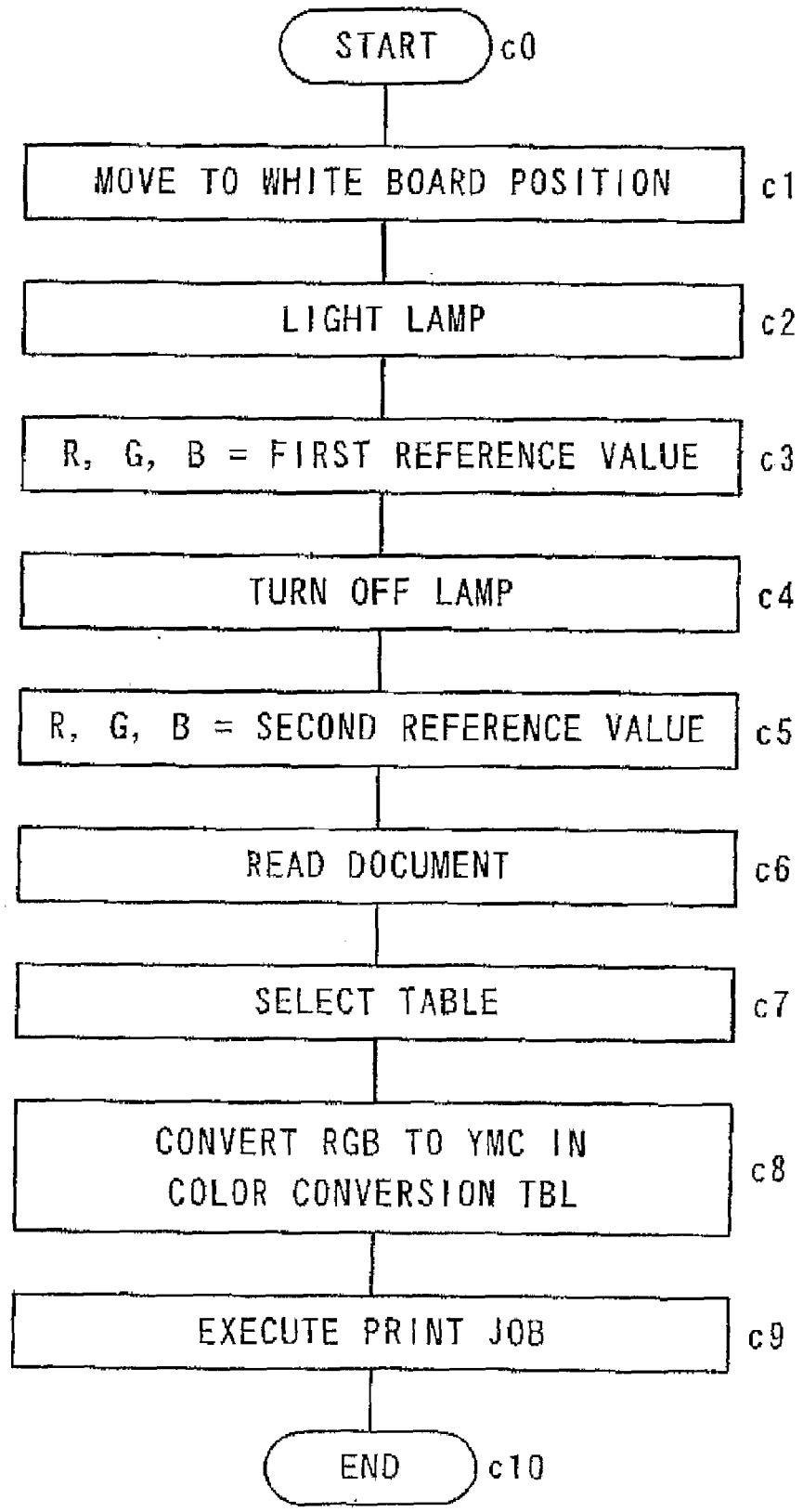
FIG. 9 is a flowchart for showing a color conversion process according to still another embodiment of the intention.

FIG. 9 is a flowchart for showing a color conversion process according to still another embodiment of the invention. The color conversion process corresponds to the image processing method according to another embodiment of the invention. The present embodiment and the above embodiment shown in FIG. 1 to FIG. 6 are different from each other only in the color conversion process, so that the same parts will be denoted by the same reference numerals and descriptions thereof will be omitted.

The processes from Step c0 to Step c6 in the flowchart shown in FIG. 9 respectively correspond to the processes from Step a1 to Step a6 in the flowchart shown in FIG. 3 and at each step, a process identical to the process at the corresponding step is carried out, so that descriptions thereof will be omitted. After Step c6 is completed, the process proceeds to Step c7 at which a selecting process for selecting the color conversion table TBL is carried out. The process at Step c7 will be described later.

After Step c7 is completed the process proceeds to Step c8. The processes from Step c8 to Step c10 respectively correspond to the processes from Step a10 to Step a12 in the flowchart shown in FIG. 3 and at each step, a process identical to the process at the corresponding step is carried out, so that descriptions thereof will be omitted.

FIG. 10 is a view showing a composition of a color conversion table. TBL used in the embodiment. The color conversion table TBL used in the embodiment is composed of a basis region table BTBL, a high tone region table HSTBL, and a low tone region table LSTBL. The basis region table BTBL is common in the first color conversion table TBL1 and the second color conversion table TBL2. In the present embodiment, there are provided a plurality of the high tone region tables HSTBL and a plurality of the low tone region tables LSTBL, among which one high tone region table HSTBL and one low tone region table are selected according to the tone values of R, G and B of the inputted image data and used together with the basic region table BTBL to carry out the color conversion.

The above-stated tone values of R, G and B between the third reference value and the fourth reference value are converted into the tone values of Y, M and C with use of the basic region table BTBL. The basic region table BTBL, the high tone region table HSTBL, and the low tone region table LSTBL are stored in the memory.

FIGS. 11A and 11B are views each of which shows one example of a part of the basic region table BTBL. FIG. 11A is a view showing one example of a basic region table BTBL1 of the color conversion table TBL which represents gray. FIG. 11B is a view showing one example of a basic region table BTBL2 of the color conversion table TBL which represents red. The basic region table BTBL1 and the basic region table BTBL2 are collectively referred to simply as the basic region table BTBL. In the basic region table BTBL, the tone values of Y, M and C are associated respectively with the regions including the tone values of R, G and B corresponding to the values 4 to 19 of the grid points GP.

FIGS. 12R to 12L are views each of which shows one example of a part of the high tone region table HSTBL. FIG. 12A to 12F are views each of which shows one example of the high tone region table HSTBL0-1 to HSTBL5-1 of the color conversion table TBL which represents gray. FIG. 12G to 12L are views each of which shows one example of the high tone region table HSTBL0-2 to HSTBL5-2 of the color conversion table TBL which represents red. The high tone region tables HSTBL0-1 to HSTBL5-1 and HSTBL0-2 to HSTBL5-2 are collectively referred to simply as the high tone region table HSTBL.

The high tone region tables HSTBL0-1 to HSTBL5-1 and HSTBL0-2 to HSTBL5-2 are respectively determined according to the maximum value P1 of the tone values of R, G and B. In the high tone region tables HSTBL, the tone values of Y, M and C are associated respectively with the regions including the tone values of R, G and B corresponding to the values 20 to 23 of the gird points GP.

The high tone region tables HSTBL0-1 and HSTBL0-2 serve as the basis among the plurality of the high tone value region tables HSTBL. In the case where the maximum P1 is equal to or less than the first reference value, the high tone region tables HSTBL0-1 and HSTBL0-2 are selected.

The respective grid points GP, the representative tone values of R, G and B, and the tone values of Y, M and C are associated with each other so that in the high tone region tables HSTBL1-1 and HSTBL1-2, the range included in the respective regions of RGB color system for respective grid points GP is wider than that in the high tone region tables HSTBL0-1 and HSTBL0-2. The high tone region table HSTBL0-1 and the high tone region table HSTBL0-2 are correctively referred to simply as the high tons region table HSTBL0.

Further, the respective grid points GP, the representative tone values of R, G and 5, and the tone values of Y, N and C are associated with each other so that in the high tone region tables HSTBL2-1 and HSTBL2-2, the range included in the respective regions of RGB color system for respective grid points GP is wider than that in the high tone region tables HSTBL1-1 and HSTBL1-2. The high tone region table HSTBL1-1 and the high tone region table HSTBL1-2 are correctively referred to simply as the high tone region table HSTBL1.

Further, the respective grid points GP, the representative tone values of R, G and B, and the tone values of Y, M and C are associated with each other so that in the high tone region tables HSTBL3-1 and HSTBL3-2, the range included in the respective regions of RGB color system for respective grid points GP is wider than that in the high tone region tables HSTBL2-1 and HSTBL2-2. The high tone region table HSTBL2-1 and the high tone region table HSTBL2-2 are correctively referred to simply as the high tone region table HSTBL2.

Further, the respective grid points GP, the representative tone values of R, G and B, and the tone values of Y, M and C are associated with each other so that in the high tone region tables HSTBL4-1 and HSTBL4-2, the range included in the respective regions of RGB color system for respective grid points GP is wider than that in the high tone region tables HSTBL3-1 and HSTBL3-2. The high tone region table HSTBL3-1 and the high tone region table HSTBL3-2 are correctively referred to simply as the high tone region table HSTBL3.

Further, the respective grid points GP, the representative tone values of R, G and B, and the tone values of Y, M and C are associated with each other so that in the high tone region tables HSTBL5-1 and HSTBL5-2, the range included in the respective regions of RCE color system for respective grid points GP is wider than that in the high tone region tables HSTBL4-1 and HSTBL4-2. The high tone region table HSTBL4-1 and the high tone region table HSTBL4-2 are correctively referred to simply as the high tone region table HSTBL4. The high tone region table HSTBL5-1 and the high tone region table HSTBL5-2 are correctively referred to simply as the high tone region table HSTBL5.

FIGS. 13A to 13H are views each of which shows one example of a part of the low tone region table LSTBL. FIGS. 13A to 13D are views each of which shows one example of the low tone region table LSTBL0-1 to LSTBL3-1 of the color conversion table TBL which represents gray. FIG. 13E to 13H are views each of which shows one example of the low tone region table LSTBL0-2 to LSTBL5-2 of the color conversion table TBL which represents red. The low tone region tables LSTBL0-2 to LSTBL5-2 are collectively referred to simply as the low tone region table LSTBL. In the low tone region table LSTBL, the tone values of Y, M and C are associated respectively with the regions including the tone values of R, G and B corresponding to the values zero to 3 of the grid points GP.

The low tone region tables LSTBL0-1 and LSTBL0-2 serve as the basis among the plurality of the low tone value region tables LSTBL. In the case where the maximum P1 is equal to or less than the first reference value, the low tone region tables LSTBL0-1 and LSTBL0-2 are selected.

The respective grid points GP, the representative tone values of R, G and B, and the tone values of Y, M and C are associated with each other so that in the low tone region tables LSTBL1-1 and LSTBL1-2, the range included in the respective regions of ROB color system for respective grid points GP is wider than that in the low tone region tables LSTBL0-1 and LSTBL0-2. The low tone region table LSTBL0-1 and the low tone region table LSTBL0-2 are correctively referred to simply as the low tone region table LSTBL0.

The respective grid points GP, the representative tone values of R, G and B, and the tone values of Y, M and C are associated with each other so that in the low tone region tables LSTBL2-1 and LSTBL2-2, the range included in the respective regions of RGB color system for respective grid points GP is wider than that in the low tone region tables LSTBL1-1 and LSTBL1-2. The low tone region table LSTBL1-1 and the low tone region table LSTBL1-2 are correctively referred to simply as the low tone region table LSTBL1.

Further, the respective grid points GP, the representative tone values of R, G and B, and the tone values of Y, M and C are associated with each other so that in the low tone region tables LSTBL3-1 and LSTBL3-2, the range included in the respective regions of RGB color system for respective grid points GP is wider than that in the low tone region tables LSTBL2-1 and LSTBL2-2. The low tone region table LSTBL2-1 and the low tone region table LSTBL2-2 are correctively referred to simply as the low tone region table LSTBL2. The low tone region table LSTBL3-1 and the low tone region table LSTBL3-2 are correctively referred to simply as the low tone region table LSTBL3.

Figure 14:
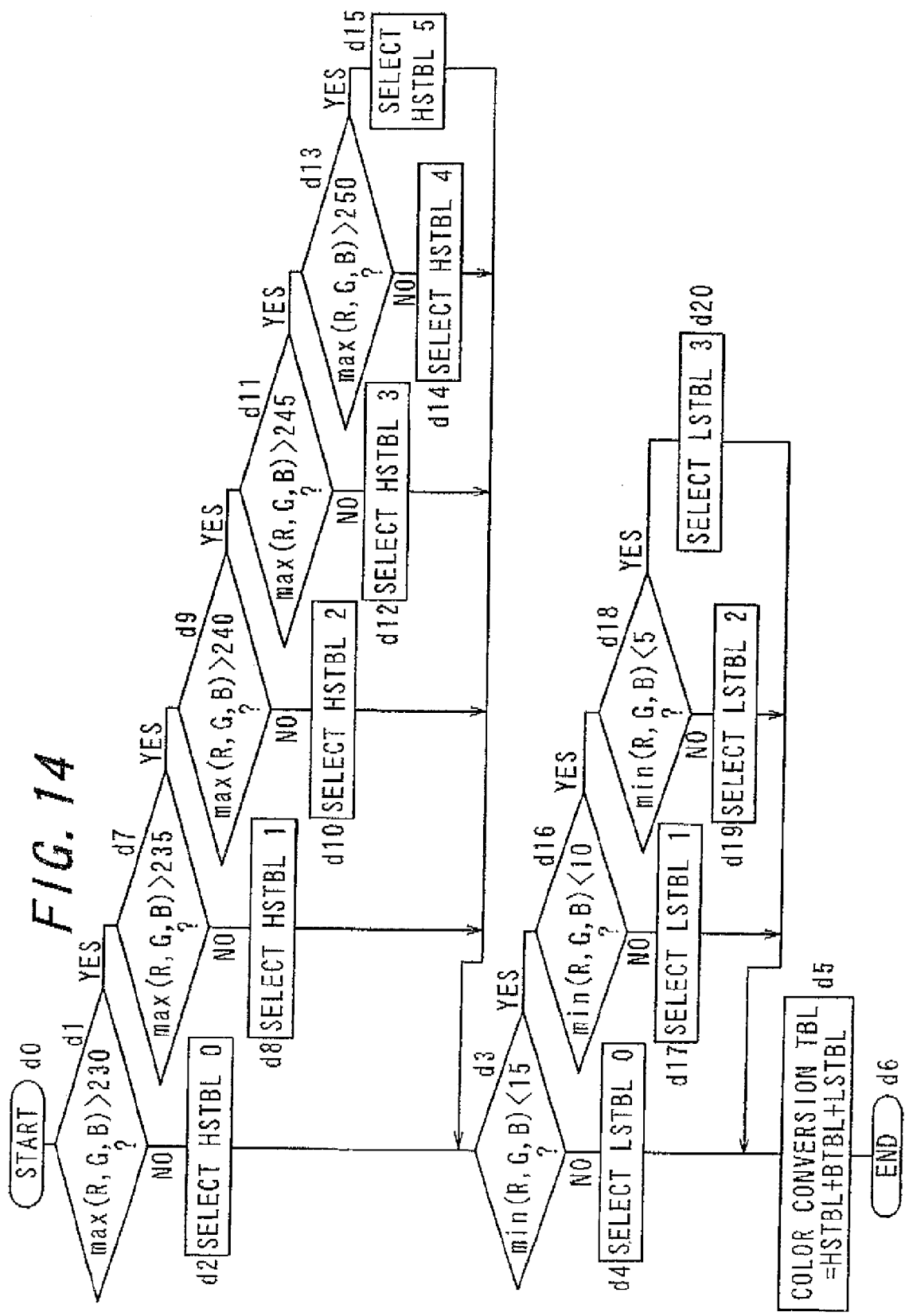
FIG. 14 is a flowchart showing a selecting process operated by the input-processing portion at one step in the flowchart of FIG. 9.

FIG. 14 is a flowchart showing a selecting process operated by the input-processing portion 41b at Step c7 in the flowchart of FIG. 9. At Step c7 in the flowchart shown in FIG. 9, the process proceeds from Step d0 to Step d1 at which the selecting process starts.

At Step d1, the input-processing portion 41b determines whether or not at least any one of the output values of the document reading section 40 when the document is read, that is to say, at least any one of the respective tone values of R, G and B in the image data exceeds the first reference value. When the input-processing portion 41b determines at Step d1 that all of the tone values are equal to or less than the first reference value, the process then proceeds to Step d2. At Step d1, the input-processing portion 41b compares the first reference value with the respective maximum values of the tone values of R, G and B. In the image data given by the document reading section 40. The maximum value of R, the maximum value of G, and the maximum value of B may be, for example, determined for every image data which correspond to one sheet of documents, or determined for every job performed on an image to be printed.

At Step d2, the high tone region table HSTBL0 is selected. The process then proceeds to Step d3.

At Step d3, the input-processing portion 41b determines whether or not at least any one of the output values of the document reading section 40 when the document is read, that is to say, at least any one of the respective tone values of R, G and B in the image data is less than the second reference value. At Step d3, the input-processing portion 41b compares the second reference value with the respective minimum values of the tone values of R, G and B in the image data given by the document reading section 40. When the input-processing portion 41b determines at Step d3 that none of the tone values are less than the second reference value, the process then proceeds to Step d4.

At Step d4, the low tone region table LSTBL0 is selected. The process then proceeds to Step d5.

At Step d5, the color conversion table TBL is created with use of one table selected from the plurality of the high tone region tables HSTBL, one table selected from the plurality of the low tone region tables LSTBL, and the basic region table BTBL. The process then proceeds to Step d6. And the process proceeds to Step c8 in the flowchart in FIG. 9.

When the input-processing portion 41b determines at Step d1 described above that at least any one of the respective tone values of R, C and B in the image data exceeds the first reference value, the process then proceeds to Step d7. At Step d7, the input-processing portion 41b determines whether or not at least any one of the respective tone values of R, G and B in the image data exceeds 235. When the input-processing portion 41b determines at Step d7 that all the tone values are 235 or less, the process then proceeds to Step d8. At Step d8, the high tone region table HSTBL1 is selected. The process then proceeds to Step a3.

When the input-processing portion 41b determines at Step d7 described above that at least any one of the respective tone values of R, G and B in the image data exceeds 235, the process then proceeds to Step d9. At Step d9, the input-processing portion 41b determiner whether or not at least any one of the respective tone values of R, G and B in the image data exceeds 240. When the input-processing portion 41b determines at Step d9 that all the tone values are 240 or less, the process then proceeds to Step d10. At Step d10, the high tone region table HSTBL2 is selected. The process then proceeds to Step d3.

When the input-processing portion 41b determines at Step d9 described above that at least any one of the respective tone values of R, G and R in the image data exceeds 240, the process then proceeds to Step d11. At Step d11, the input-processing portion 41b determines whether or not at least any one of the respective tone values of R, G and B in the image data exceeds 245. When the input-processing portion 41b determines at Step d1 that all the tone values are 245 or less, the process then proceeds to Step d12. At Step d12, the high tone region table HSTBL3 is selected. The process then proceeds to Step d3.

When the input-processing portion 41b determines at Step d11 described above that at least any one of the respective tone values of R, G and B in the image data exceeds 245, the process then proceeds to Step d13. At Step d13, the input-processing portion 41b determines whether or not at least any one of the respective tone values of R, G and B in the image data exceeds 250. When the input-processing portion 41b determines at Step d13 that all the tone values are 250 or less, the process then proceeds to Step d14. At Step d14, the high tone region table HSTBL4 is selected. The process then proceeds to Step d3.

When the input-processing portion 41b determines at Step d13 described above that at least any one of the respective tone values of R, G and B in the image data exceeds 250, the process then proceeds to Step d15. At Step d15, the high tone region table HSTBL5 is selected. The process then proceeds to Step d3.

When the input-processing portion 41b determines at step d3 described above that at least any one of the respective tone values of R, G and B in the image data is less than the second reference value, the process then proceeds to Step d16. At Step d16, the input-processing portion 41b determines whether or not at least any one of the respective tone values of R, G and B in the image data is less than 10. When the input-processing portion 41b determines at Step d16 that none of the tone values are less than 10, the process then proceeds to Step d17. At Step d17, the low tone region table LSTBL1 is selected. The process then proceeds to Step d5.

When the input-processing portion 41b determines at Step d16 described above that at least any one of the respective tone values of R, G and B in the image data is less than 10, the process then proceeds to Step d18. At Step d18, the input-processing portion 41b determines whether or not at least any one of the respective tone values of R, G and B in the image data is less than 5. When the input-processing portion 41b determines at Stet d18 that none of the tone values are less than 5, the process then proceeds to Step d19. At Step d19, the low tone region table LSTBL2 is selected. The process then proceeds to Step d5.

When the input-processing portion 41b determines at Step d18 described above that at least any one of the respective tone values of R, G and B in the image data is less than 5, the process then proceeds to Step d20. At Step d20, the low tone region table LSTBL3 is selected. The process then proceeds to Step d5.

As in the case of the above embodiment, the tone reproducibility can be improved in the present embodiment as above. That is to say, the high tone region table HSTBL and the low tone region table LSTBL can be selected according to the maximum value and minimum value of the tone values of R, G and B, thus allowing for the conversion into the tone values of Y, M and C with use of the color conversion table which is the most appropriate for the inputted image data. In addition, the storage capacity required for storing the tables can be smaller as compared to the case of storing in advance a plurality of, the sets of the high tone region table HSTBL, the low tone region table LSTBL, and the basic region table BTBL.

In all the embodiments described above, the tone value for white is larger than the tone value for black. The process is basically the same also in the case where the tone value for black is larger than the tone value for white though being only different in the value. In the case, it is therefore possible to obtain effects which are the same as those obtained in the above embodiments.

Further, although the expanding process is carried out around the first reference value closer to white and the second reference value closer to black in all the embodiments described above, the expanding process may be carried out only around the first reference value closer to white in another embodiment of the invention. Even in the configuration as just stated, the tone reproducibility can be improved because the influence of color misalignment upon printing a color close to white is larger than that upon printing a color close to black. In this case, the configuration only needs to change in that, for example in the embodiment shown in FIG. 3, the tone values corresponding to the values 2 to 5 of the grid points GP in the second color conversion tables TBL2 shown in FIG. 5C and FIG. 5D are replaced by the tone values corresponding to the values 2 to 5 of the grid points GP in the first color conversion tables TBL1 shown in FIG. 5A and FIG. 5B, and for example in the embodiment shown in FIG. 9, Steps d3, d4, and d16 to d20 in the flowcharts shown in FIGS. 11A and 11B are deleted.

In yet another embodiment of the invention, the program for executing the above-described image processing method may be executed by a computer to carry out the image processing method according to each of the above-described embodiments.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An image processing method for color conversion from image data represented in an RGB color system and outputted from a reading device for reading a document, into image data represented in a YMC color system by using a color conversion table where a plurality of regions sectioned into blocks in a color space of RGB color system are associated respectively with predetermined tone values of Y (yellow), M (magenta) and C (cyan), the image processing method comprising the steps of:

carrying out shading correction for, in a case where tone values of R (red), G (green) and B (blue) for representing white are larger than tone values of R, G and B for representing black, adjusting output values of the reading device which are obtained in reading a reference of white from the reading device, to a predetermined first reference value smaller than a maximum tone value, and adjusting output values of the reading device which are obtained in reading a reference of black from the reading device, to a predetermined second reference value larger than a minimum tone value, and in a case where tone values of R, G and B for representing black are larger than tone values of R, G and B for representing white, adjusting output values of the reading device which are obtained in reading the reference of white from the reading device, to the predetermined second reference value larger than the minimum tone value, and adjusting output values of the reading device which are obtained in reading the reference of black from the reading device, to the predetermined first reference value smaller than the maximum tone value; and carrying out color conversion by using a color conversion table obtained by expanding ranges around the predetermined first reference value and the second reference value in the color conversion table, ranges being included in the regions of RGB color system associated respectively with predetermined tone values of Y, M and C, in a case where at least any one of output values of R, G and B outputted from the reading device after reading a document is out of a range between the predetermined first reference value and the predetermined second reference value.

2. The image processing method of claim 1, wherein each of the regions of RGB color system corresponds to a plurality of tone values for each of R, G and B.

3. The image processing method of claim 1, wherein in expanding the range included in the regions of RGB color system, a maximum value of the tone values of RGB color system after expansion is selected to be a maximum value of R (red), G (green) and B (blue) among the output values of the reading device after reading the document.

4. The image processing method of claim 1, wherein, of the color space of RGB system, even the region where any of the tone values of R, G and B is out of a range between the first reference value and the second reference value, is associated with the predetermined tone values of Y, M and C in the color conversion table.

5. The image processing method of claim 1, wherein, of the color space of RGB system, the region where the tone values of R, G and B are included in a range between the first reference value and the second reference value, is associated with the predetermined tone values of Y, M and C in the color conversion table to which no expanding process is applied.

6. An image processing apparatus for performing image processing through the image processing method of claim 1.

7. An image processing method for color conversion from image data outputted from a reading device for reading a document, in which image data is represented in an RGB color system and in which image data tone values of R (red), G (green) and B (blue) for representing white are larger than tone values of R, G and B for representing black, into image data represented in a YMC color system by using a color conversion table where a plurality of regions sectioned into blocks in a color space of RGB color system are associated respectively with predetermined tone values of Y (yellow), M (magenta) and C (cyan), the image processing method comprising the steps of:

adjusting an output values of the reading device which are obtained in reading a reference of white from the reading device, to a predetermined first reference value smaller than a maximum tone value, and adjusting output values of the reading device which are obtained in reading a reference of black from the reading device, to a predetermined second reference value larger than a minimum tone value; and carrying out color conversion by using a color conversion table obtained by expanding a range which is located around the region including the predetermine first reference value in the color conversion table and is included in the regions of RGB color system associated respectively with predetermined tone values of Y, M and C, in a case where at least any one of output values of R, G and B outputted from the reading device after reading a document exceeds the predetermined first reference value.

8. The image processing method of claim 7, wherein each of the regions of RGB color system corresponds to a plurality of tone values for each of R, G and B.

9. The image processing method of claim 7, wherein in expanding the range included in the regions of RGB color system, a maximum value of the tone values of RGB color system after expansion is selected to be a maximum value of R (red), G (green) and B (blue) among the output values of the reading device after reading the document.

10. The image processing method of claim 7, wherein, of the color space of RGB system, even the region where any of the tone values of R, G and B is out of a range between the first reference value and the second reference value, is associated with the predetermined tone values of Y, M and C in the color conversion table.

11. The image processing method of claim 7, wherein, of the color space of RGB system, the region where the tone values of R, G and B are included in a range between the first reference value and the second reference value, is associated with the predetermined tone values of Y, M and C in the color conversion table to which no expanding process is applied.

12. An image processing apparatus for performing image processing through the image processing method of claim 7.

13. An image processing method for color conversion from image data outputted from a reading device for reading a document, in which image data is represented in an RGB color system and in which image data tone values of R (red), G (green) and B (blue) for representing white are larger than tone values of R, G and B for representing black, into image data represented in a YMC color system by using a color conversion table where a plurality of regions sectioned into blocks in a color space of RGB color system are associated respectively with predetermined tone values of Y (yellow), M (magenta) and C (cyan), the image processing method comprising the steps of:

adjusting an output values of the reading device which are obtained in reading a reference of white from the reading device, to a predetermined first reference value smaller than a maximum tone value, and adjusting output values of the reading device which are obtained in reading a reference of black from the reading device, to a predetermined second reference value larger than a minimum tone value; and carrying out color conversion by using a color conversion table obtained by expanding a range which is located around the region including the predetermine first reference value in the color conversion table and is included in the regions of RGB color system associated respectively with predetermined tone values of Y, M and C, in a case where at least any one of output values of R, G and B outputted from the reading device after reading a document exceeds the predetermined first reference value, wherein the range to be expanded is set to be a range located closer to the predetermined first reference value relative to a predetermined third reference value which is smaller than the predetermined first reference value by a predetermined value.

* * * * *